US010472019B2

(12) United States Patent
Pfeiffer

(10) Patent No.: US 10,472,019 B2
(45) Date of Patent: Nov. 12, 2019

(54) AXLE MOUNTING SYSTEM

(71) Applicant: Wolf Tooth Components, LLC, Savage, MN (US)

(72) Inventor: Michael W. Pfeiffer, Savage, MN (US)

(73) Assignee: Wolf Tooth Components, Inc., Savage, MN (US)

( * ) Notice: Subject to any disclaimer, the term of this patent is extended or adjusted under 35 U.S.C. 154(b) by 99 days.

(21) Appl. No.: 15/679,657

(22) Filed: Aug. 17, 2017

(65) Prior Publication Data

US 2018/0050758 A1 Feb. 22, 2018

Related U.S. Application Data

(60) Provisional application No. 62/376,721, filed on Aug. 18, 2016.

(51) Int. Cl.
*B62K 25/02* (2006.01)
*B62K 3/10* (2006.01)
*B62K 25/04* (2006.01)

(52) U.S. Cl.
CPC ................ *B62K 25/02* (2013.01); *B62K 3/10* (2013.01); *B62K 2025/047* (2013.01)

(58) Field of Classification Search
CPC ..... B62K 25/02; B62K 3/10; B62K 2025/047
USPC ........................................................ 280/281.1
See application file for complete search history.

(56) References Cited

U.S. PATENT DOCUMENTS

| | | | | |
|---|---|---|---|---|
| 4,540,062 A | | 9/1985 | Kashiwai | |
| 5,546,665 A | | 8/1996 | Jackmauh | |
| 5,653,512 A | | 8/1997 | Phillips | |
| 5,888,159 A | | 3/1999 | Liao | |
| 6,474,432 B1 | | 11/2002 | Schmidt et al. | |
| 6,926,297 B2 | | 8/2005 | Czysz | |
| 6,966,571 B2 | | 11/2005 | Czysz | |
| 7,287,772 B2 | * | 10/2007 | James | B62K 25/02 180/227 |
| 7,637,830 B2 | | 12/2009 | Greilinger | |
| 7,690,668 B2 | | 4/2010 | Holroyd | |
| 7,837,000 B2 | | 11/2010 | Matsuura et al. | |
| 7,854,441 B2 | * | 12/2010 | Scurlock | B62K 25/02 248/200 |
| 7,918,474 B2 | | 4/2011 | Waxham | |
| 8,740,239 B2 | * | 6/2014 | Lumpkin | B62K 19/30 280/285 |
| 8,899,606 B2 | | 12/2014 | Cocalis | |

(Continued)

OTHER PUBLICATIONS

Overholt, "Trek Gorges on Fatter Tires with All New Mid Fat Stache and New 26x5 and 27.5x4 Wheeled Farley Fat Bikes", Apr. 18, 2015, Retrieved from: https://www.bikerumor.com/2015/04/18/trek-gorges-on-fatter-tires-with-all-new-mid-fat-stache-and-new-26x5-and-27-5x4-wheeled-farley-fat-bikes/, 9 pages.

*Primary Examiner* — Jacob D Knutson

(74) *Attorney, Agent, or Firm* — Dicke, Billig & Czaja, PLLC

(57) ABSTRACT

An axle mounting system includes a pair of axle supports each to be positioned within a respective one of a pair of openings and each having an axle support hole therethrough, a pair of positioning chips each to be positioned within a respective one of the openings and each having a hole therethrough to receive a respective one of the axle supports, and a pair of fixing nuts each to secure the respective one of the axle supports within the respective one of the openings.

35 Claims, 24 Drawing Sheets

(56) References Cited

U.S. PATENT DOCUMENTS

| | | | | |
|---|---|---|---|---|
| 8,998,236 | B2 * | 4/2015 | Trimble | B62K 25/286<br>280/281.1 |
| 9,308,961 | B2 * | 4/2016 | McDonald | B62K 25/02 |
| 2011/0042917 | A1 * | 2/2011 | Cleveland | B62K 19/24<br>280/288 |
| 2012/0022885 | A1 | 9/2012 | Chen | |
| 2012/0274042 | A1 | 11/2012 | Harris et al. | |
| 2015/0259026 | A1 * | 9/2015 | Norstad | B62K 25/02<br>280/284 |

* cited by examiner

AXLE MOUNTING SYSTEM

CROSS-REFERENCE TO RELATED APPLICATIONS

This application claims priority under 35 U.S.C. § 119(e) to U.S. Provisional Patent Application Ser. No. 62/376,721 filed on Aug. 18, 2016, and incorporated herein by reference.

BACKGROUND

The present disclosure relates generally to an axle mounting system and, more specifically, relates to an adjustable or multi-positionable rear axle or rear axle mounting system for a bicycle.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Figure 1:
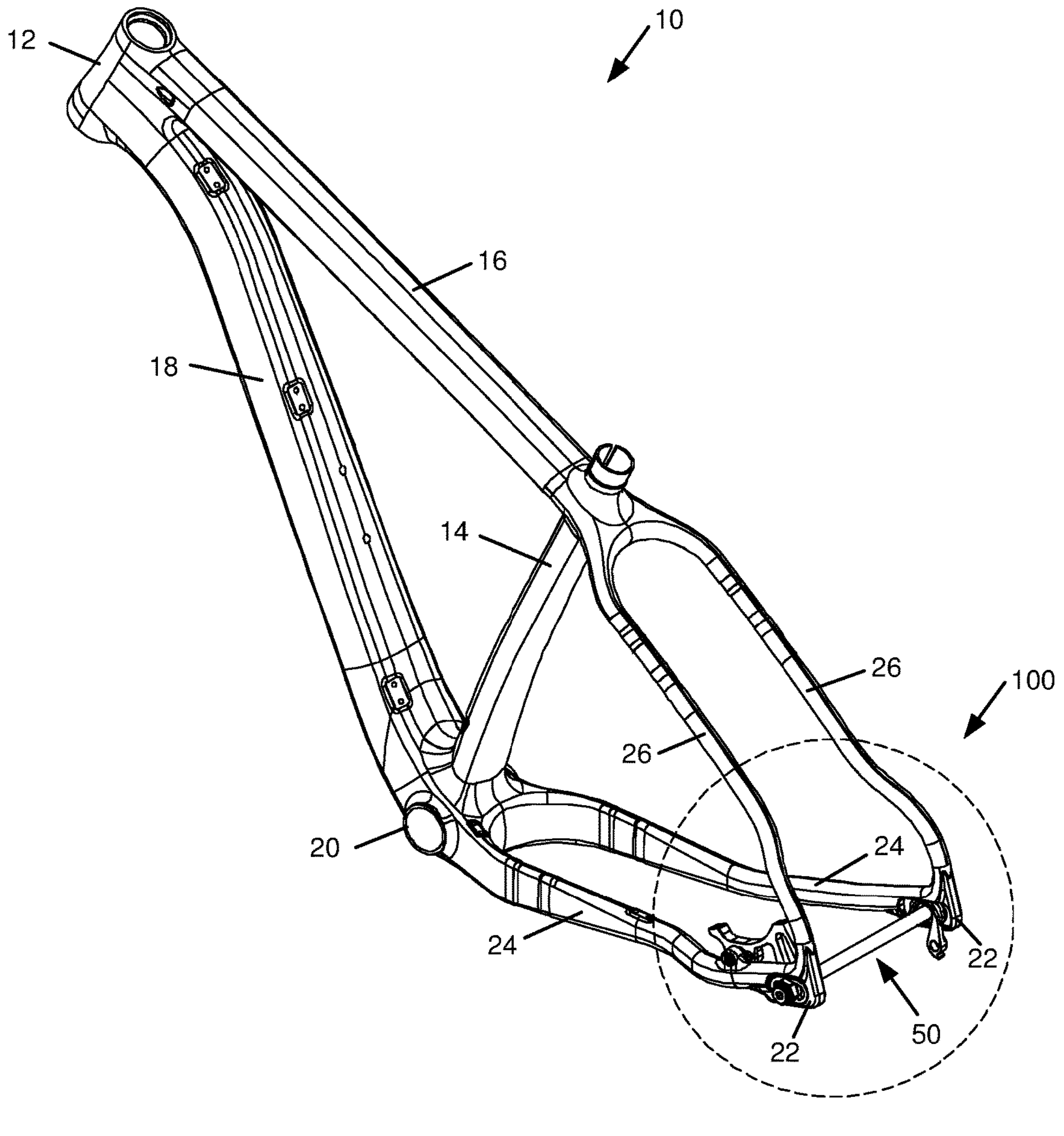
FIG. 1 is a perspective view of one example of a bicycle frame including an example of an axle mounting system in accordance with the present disclosure.
Figure 2:
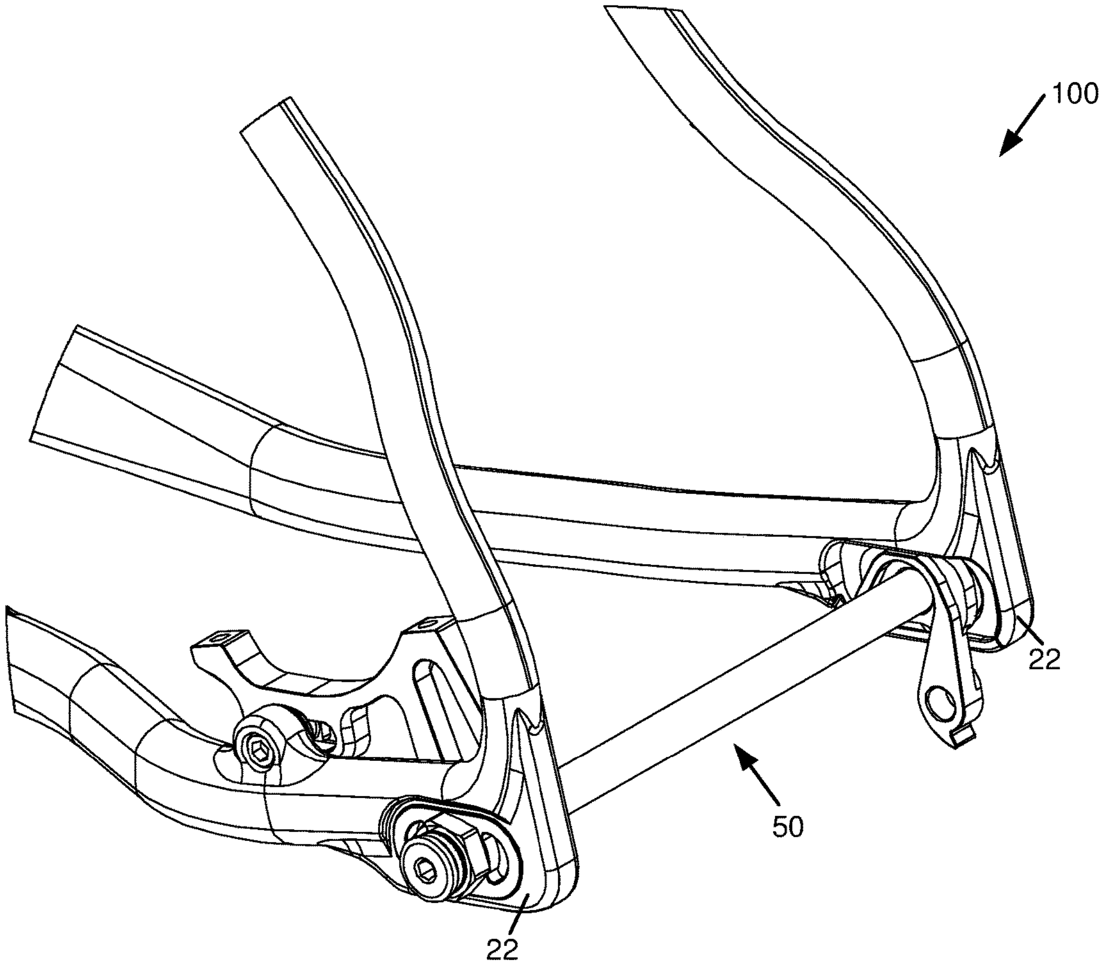
FIGS. 2, 3, 4, and 5 are enlarged views of the area within the broken line circle of FIG. 1.
Figure 3:
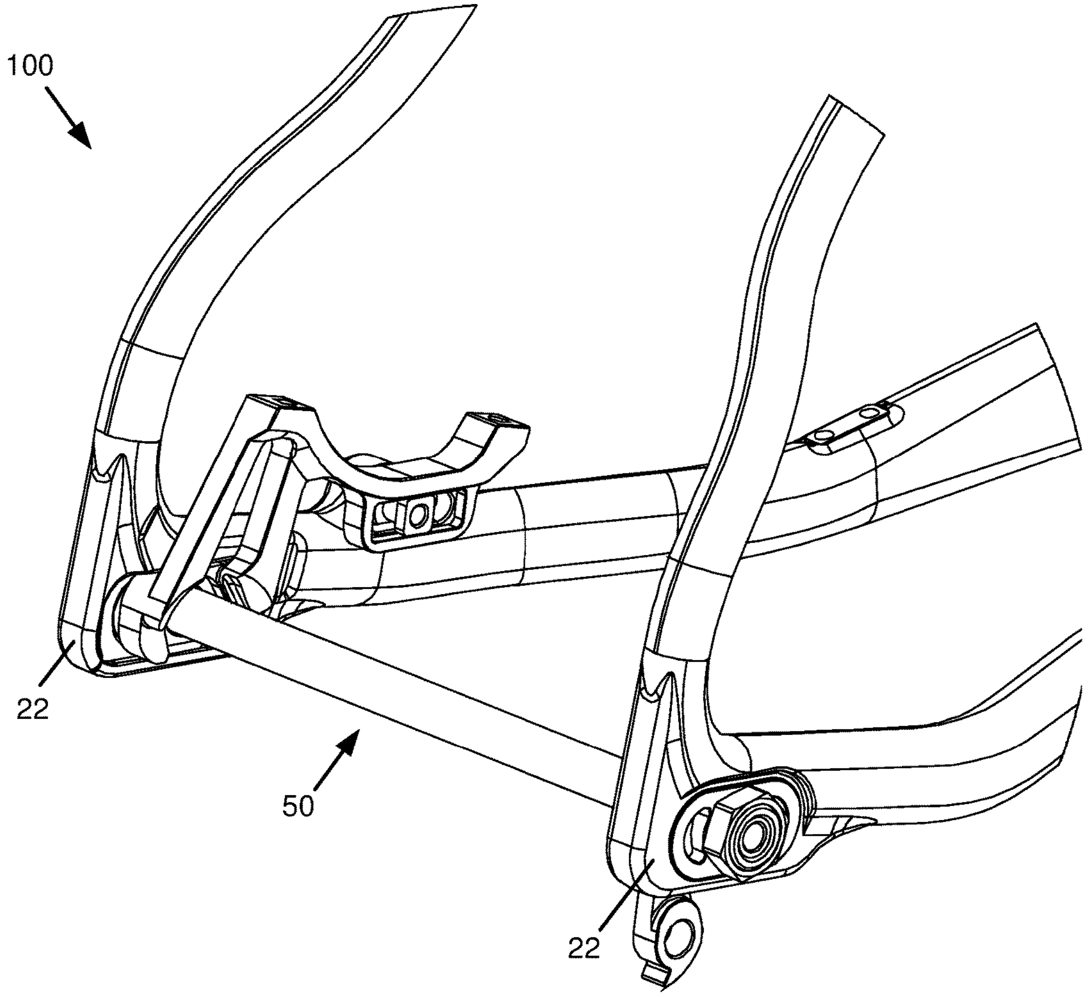
Figure 4:
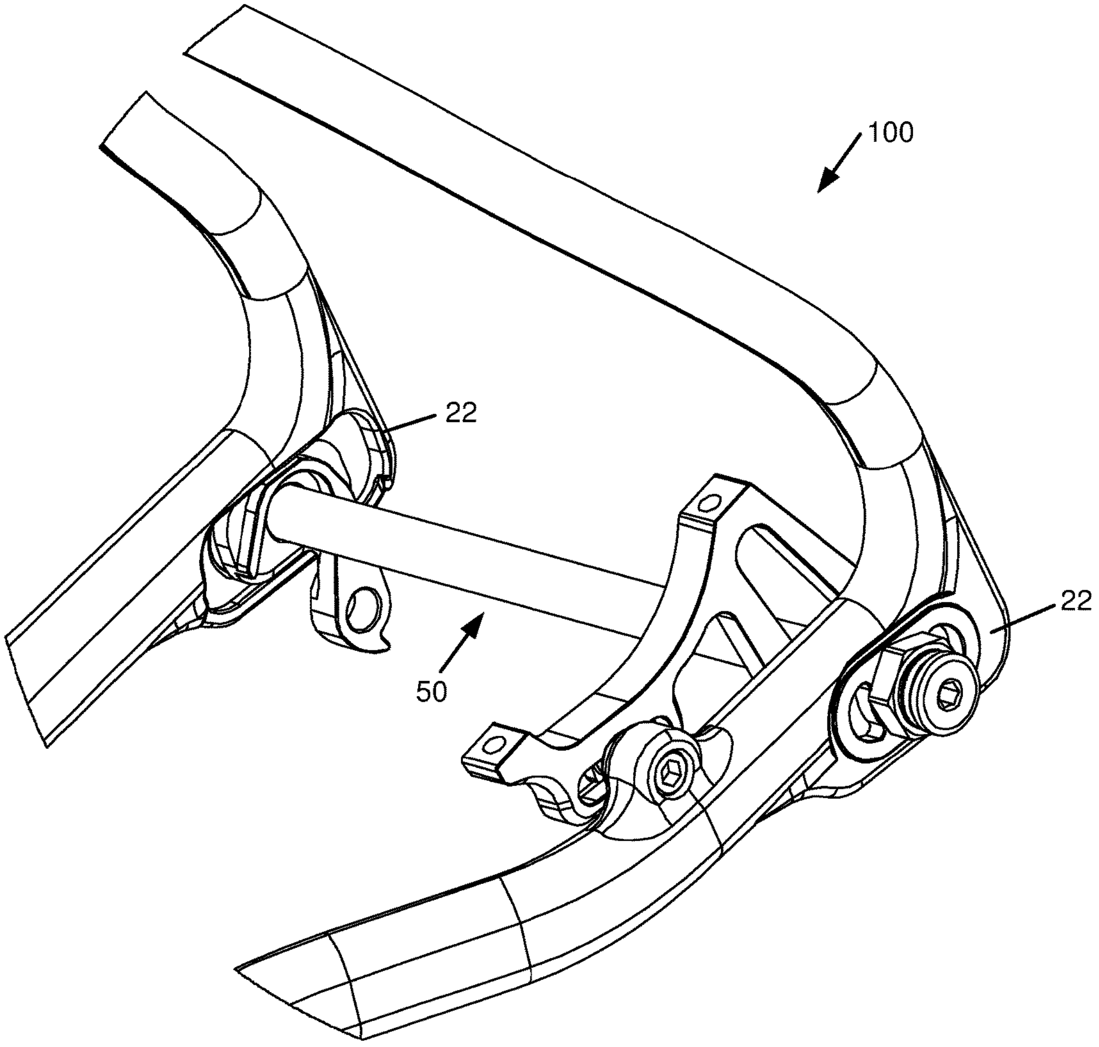
Figure 5:
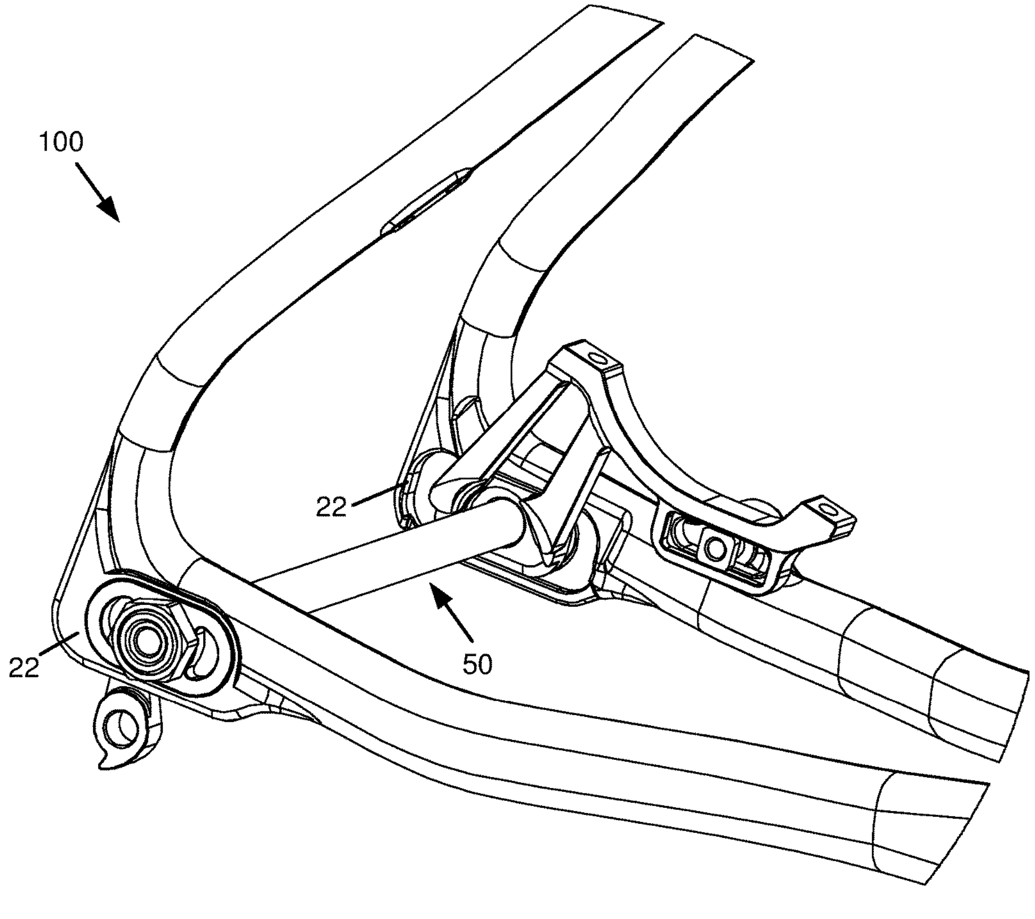

FIG. 1 is a perspective view of one example of a bicycle frame 10 for a bicycle including an example of an axle mounting system 100 for a rear axle 50 for a rear wheel of the bicycle. As illustrated in the example of FIG. 1, bicycle frame 10 includes a head tube 12, a seat tube 14, a top tube 16, a down tube 18, a bottom bracket shell 20, rear drop-outs 22, chain stays 24, and seat stays 26 such that, in one example, top tube 16 extends between head tube 12 and seat tube 14, down tube 18 extends between head tube 12 and bottom bracket shell 20, chain stays 24 extend between bottom bracket shell 20 and rear drop-outs 22, and seat stays 26 extend between seat tube 14 and rear drop-outs 22. Although described as "tubes", head tube 12, seat tube 14, top tube 16, and down tube 18, as well as chain stays 24 and seat stays 26, may be of numerous and/or varying shapes, including numerous and/or varying cross-sectional shapes.

In one example, head tube 12 is configured to receive a steerer tube (not shown) of a fork that supports a front wheel of the bicycle, and a stem is secured to the steerer tube to support handlebars of the bicycle. In addition, in one example, seat tube 14 is configured to receive a seat post that supports a seat of the bicycle, and bottom bracket shell 20 is configured to support a crankset to which pedals (not shown) of the bicycle are attached. Furthermore, in one example, rear drop-outs 22 are configured to support a rear wheel of the bicycle. More specifically, rear drop-outs 22 are configured to receive an adjustable or multi-positionable rear axle or rear axle mounting system for a rear wheel of a bicycle such that a distance from rear axle 50 to a center of bottom bracket shell 20 is adjustable or variable.

Figure 6:
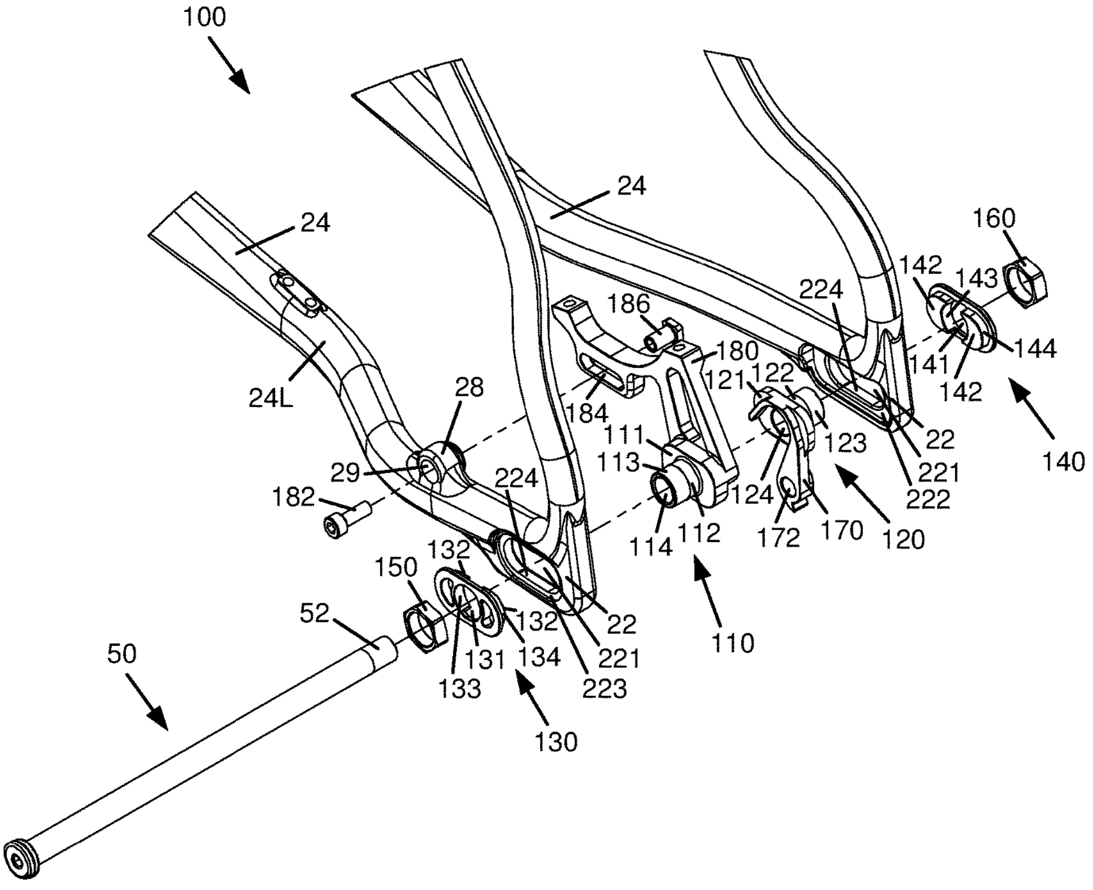
FIGS. 6 and 7 are exploded views of the area within the broken line circle of FIG. 1 illustrating an example of the axle mounting system in one configuration.
Figure 7:
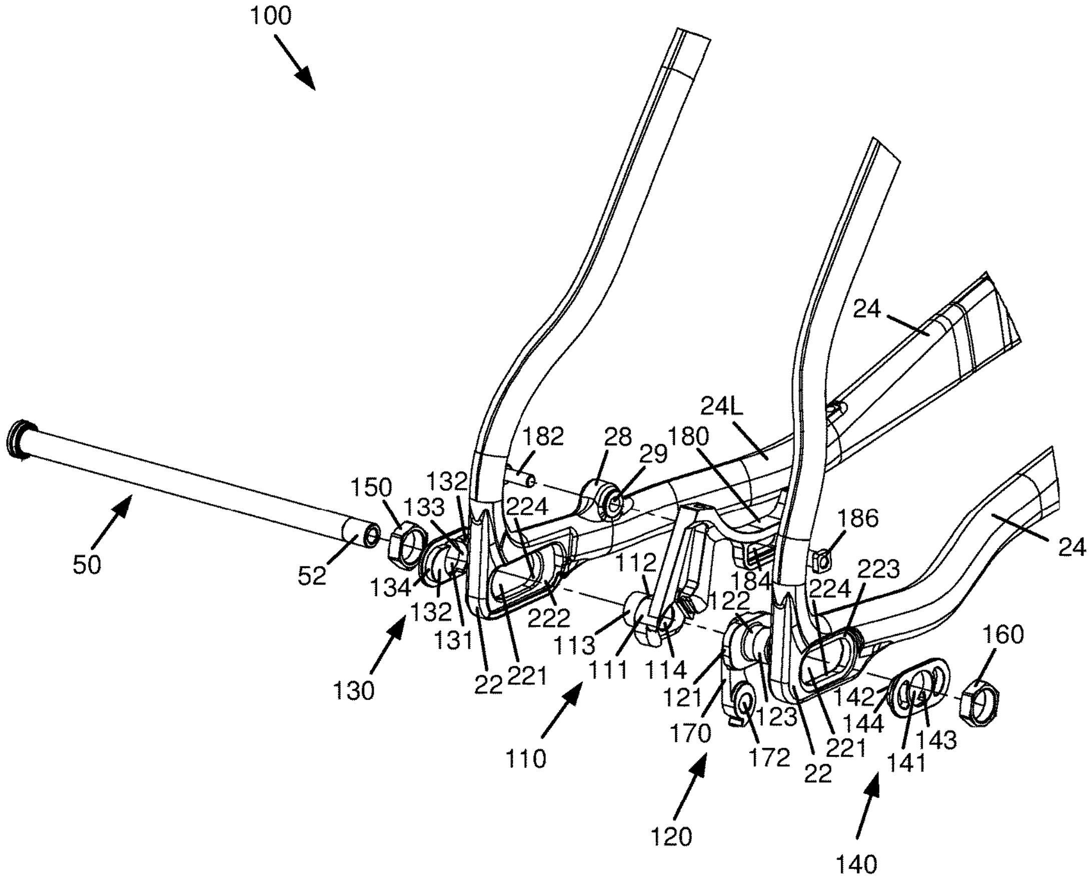

FIGS. 2, 3, 4, and 5 are enlarged views and FIGS. 6 and 7 are exploded views of the area within the broken line circle of FIG. 1 illustrating an example of axle mounting system 100 in one configuration. In one example, axle mounting system 100 provides an adjustable or multi-positionable rear axle or rear axle mounting system for a rear wheel of a bicycle such that a distance from rear axle 50 to a center of bottom bracket shell 20 (FIG. 1) is adjustable or variable. In one implementation, rear drop-outs 22 each include an opening 221 into which or through which rear axle 50 extends and is supported, and within which a position of rear axle 50 is adjusted or varied. In one example, opening 221 is an elongated opening and has a closed perimeter. In one implementation, opening 221 is a rounded rectangle having a long axis oriented at an angle relative to a horizontal reference extended from and through a centerline of bottom bracket shell 20 (FIG. 1).

In one implementation, as illustrated in FIGS. 6 and 7, axle mounting system 100 includes axle supports 110 and 120, tuning or positioning chips 130 and 140, and fixing nuts 150 and 160, with axle support 110 representing a left axle support, axle support 120 representing a right axle support, positioning chip 130 representing a left positioning chip, positioning chip 140 representing a right positioning chip, fixing nut 150 representing a left fixing nut, and fixing nut 160 representing a right fixing nut.

In one example, axle support 110 includes a body 111 and a sleeve 112 extended from body 111, with a common axle support hole 114 provided through body 111 and sleeve 112. In addition, axle support 120 includes a body 121 and a sleeve 122 extended from body 121, with a common axle support hole 124 provided through body 121 and sleeve 122. In one example, sleeve 112 includes external threads 113 to threadingly receive fixing nut 150 and secure axle support 110 within a respective drop-out 22, and sleeve 122 includes external threads 123 to threadingly receive fixing nut 160 and secure axle support 120 within a respective drop-out 22, as described below. In addition, in one example, sleeve 122 of axle support 120 includes internal threads 125 (FIG. 11) to threadingly receive a threaded end 52 of axle 50 and secure axle 50 within drop-outs 22.

In one example, bodies 111 and 121 each are sized and/or shaped to mate with and/or fit within an axle support recess 222 of a respective drop-out 22. For example, in one implementation, bodies 111 and 121 each have a rounded rectangular shape, and each are of a length less than a length of axle support recess 222 of a respective drop-out 22 and of a height substantially the same as a height of axle support recess 222 of the respective drop-out 22. As such, in one implementation, bodies 111 and 121 each are slidingly positionable within axle support recess 222 of a respective drop-out 22 to adjust or vary a position of axle 50, as described below.

In one example, positioning chip 130 has a hole 131 provided therethrough, and includes axle support positioning surfaces 133 and chip positioning surfaces 134. In one implementation, axle support positioning surfaces 133 and chip positioning surfaces 134 are formed by shoulders 132 provided on opposite sides of hole 131 such that axle support positioning surfaces 133 extend from hole 131 and chip positioning surfaces 134 extend from axle support positioning surfaces 133. In addition, in one example, positioning chip 140 has a hole 141 provided therethrough, and includes axle support positioning surfaces 143 and chip positioning surfaces 144. In one implementation, axle support positioning surfaces 143 and chip positioning surfaces 144 are formed by shoulders 142 provided on opposite sides of hole 141 such that axle support positioning surfaces 143 extend from hole 141 and chip positioning surfaces 144 extend from axle support positioning surfaces 143.

In one example, positioning chips 130 and 140 each are sized and/or shaped to mate with and/or fit within a positioning chip recess 223 of a respective drop-out 22. For example, in one implementation, positioning chips 130 and 140 each have a rounded rectangle shape, and each are of a length substantially the same as a length of positioning chip recess 223 of a respective drop-out 22 and of a height substantially the same as a height of positioning chip recess 223 of the respective drop-out 22. As such, chip positioning surfaces 134 and 144 of positioning chips 130 and 140 contact a perimeter surface 224 of opening 221 of a respective drop-out 22 when positioning chips 130 and 140 are positioned within opening 221 of a respective drop-out 22. In addition, in one example, axle support positioning surfaces 133 and 143 contact sleeves 112 and 122 of respective axle supports 110 and 120 when positioning chips 130 and 140 are positioned within opening 221 of a respective drop-out 22 and sleeves 112 and 122 are inserted into holes 131 and 141 of respective positioning chips 130 and 140.

In one implementation, positioning chips 130 and 140 are substantially the same (identical), and are symmetrical about an axis of respective holes 131 and 141. More specifically, holes 131 and 141 are located at (approximately) a midpoint of a long axis of positioning chips 130 and 140. As such, positioning chips 130 and 140 represent a first pair of positioning chips or positioning spacers for axle mounting system 100.

In one example, axle support 120 includes a derailleur hanger 170 with an internally threaded hole 172 configured to receive and support a rear derailleur (not shown) of a bicycle. In one implementation, derailleur hanger 170 is integral with and extends from body 121 of axle support 120.

In one example, axle support 110 includes a mount or adapter 180 for a disc brake caliper of a bicycle. In one implementation, disc brake caliper mount or adapter 180 is integral with and extends from body 111 of axle support 110. As such, in one example, a chain stay 24L (of chain stays 24) on a non-drive side of frame 10 is configured to support disc brake caliper mount or adapter 180. In one implementation, chain stay 24L includes a tab or boss 28 into which or through which a mounting or fixing bolt 182 for disc brake caliper mount or adapter 180 is inserted. In one example, an opening or hole 29 is formed through tab or boss 28 to receive mounting or fixing bolt 182 for disc brake caliper mount or adapter 180.

In one example, disc brake caliper mount or adapter 180 has an opening or slot 184 formed therethrough for securing mount or adapter 180 to tab or boss 28. More specifically, in one example, a fixing nut 186 (with internal threads) is received in or extended through opening or slot 184 and threadingly mated with external threads of mounting or fixing bolt 182 to secure mount or adapter 180 to tab or boss 28. In one implementation, to permit mount or adapter 180 to move with rear axle 50 as a position of rear axle 50 is adjusted or varied, opening or slot 184 is an elongated opening or slot having a long axis oriented parallel with (substantially parallel with) a long axis of opening 221 of a respective drop-out 22. More specifically, opening or slot 184 is oriented at an angle relative to a horizontal reference extended from and through a centerline of bottom bracket shell 20. As such, in one example, disc brake caliper mount or adapter 180 moves parallel with (substantially parallel with) a long axis of opening 221 of respective drop-out 22 as a position of rear axle 50 is adjusted or varied.

Figure 8:
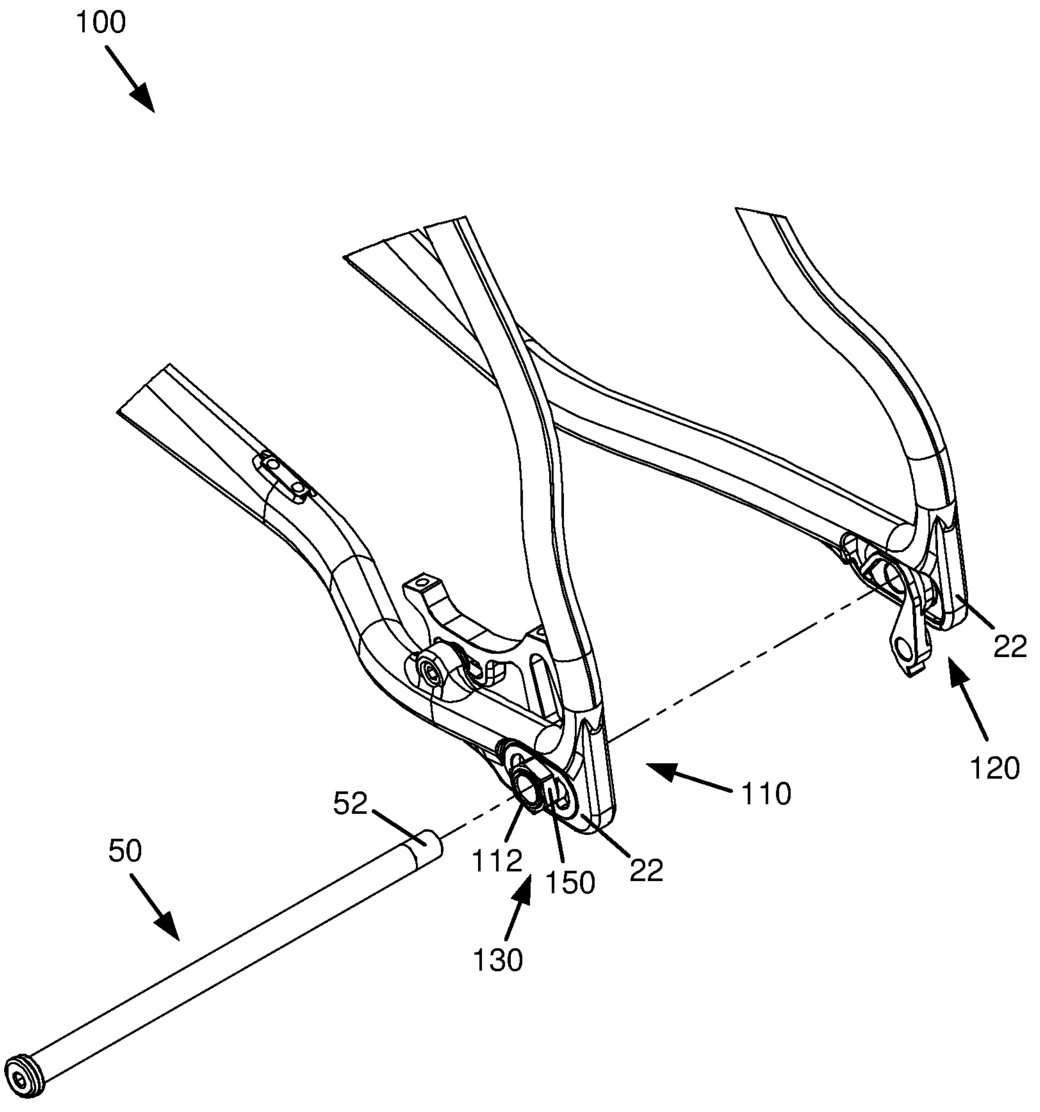
FIGS. 8 and 9 are assembled views of the axle mounting system of FIGS. 6 and 7.
Figure 9:
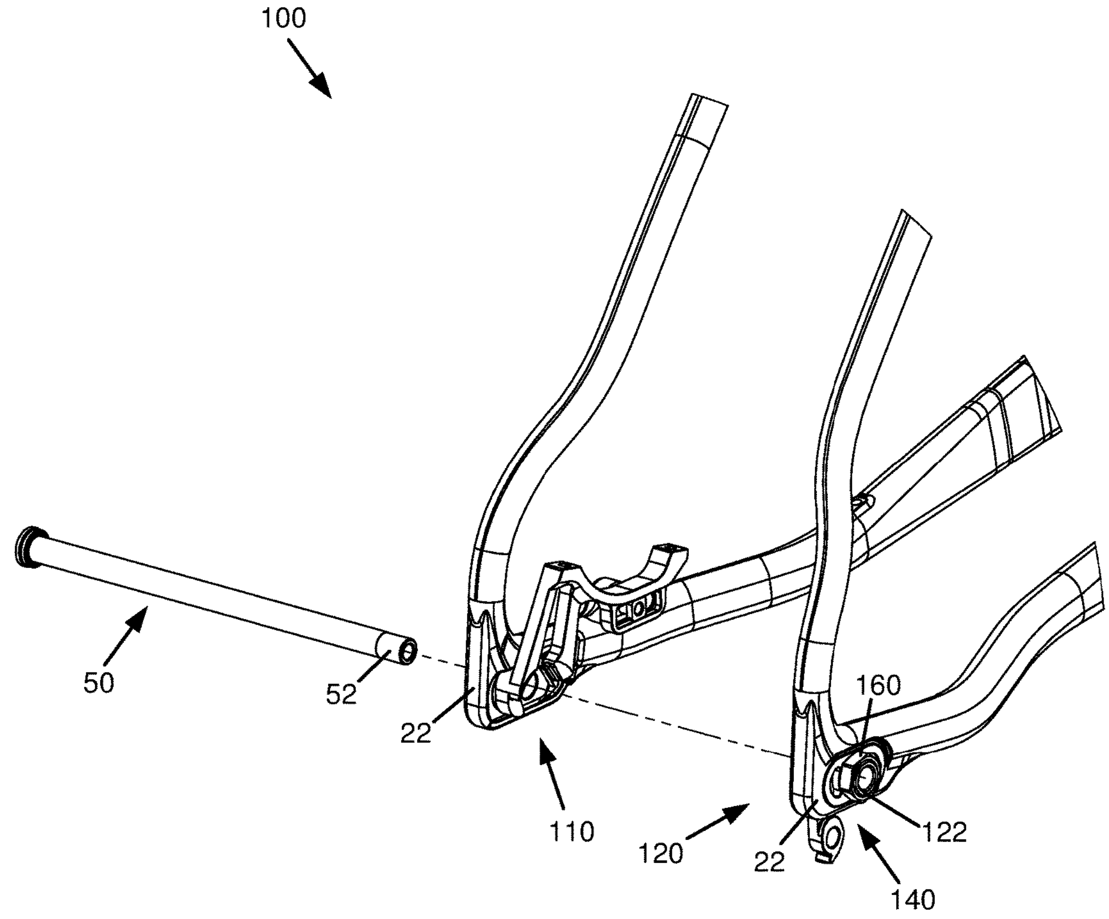

As illustrated in FIGS. 8 and 9, and with additional reference to FIGS. 6 and 7, axle supports 110 and 120 are positioned within drop-outs 22 by respective positioning chips 130 and 140, and are secured within drop-outs 22 by respective fixing nuts 150 and 160. More specifically, in one example, positioning chip 130 is positioned within positioning chip recess 223 of a respective drop-out 22 with shoulders 132 extending into opening 221, and sleeve 112 of axle support 110 is inserted into and extended through hole 131 of positioning chip 130 such that fixing nut 150 is threaded onto threads 113 of sleeve 112 to secure axle support 110 within the respective drop-out 22. In addition, positioning chip 140 is positioned within positioning chip recess 223 of a respective drop-out 22 with shoulders 142 extending into opening 221, and sleeve 122 of axle support 120 is inserted into and extended through hole 141 of positioning chip 140 such that fixing nut 160 is threaded onto threads 123 of sleeve 122 to secure axle support 120 within the respective drop-out 22. As such, positioning chips 130 and 140 are positioned on one side (e.g., outside) of a respective drop-out 22, and axle supports 110 and 120 are positioned on an opposite side (e.g., inside) of the respective drop-out 22.

Figure 10:
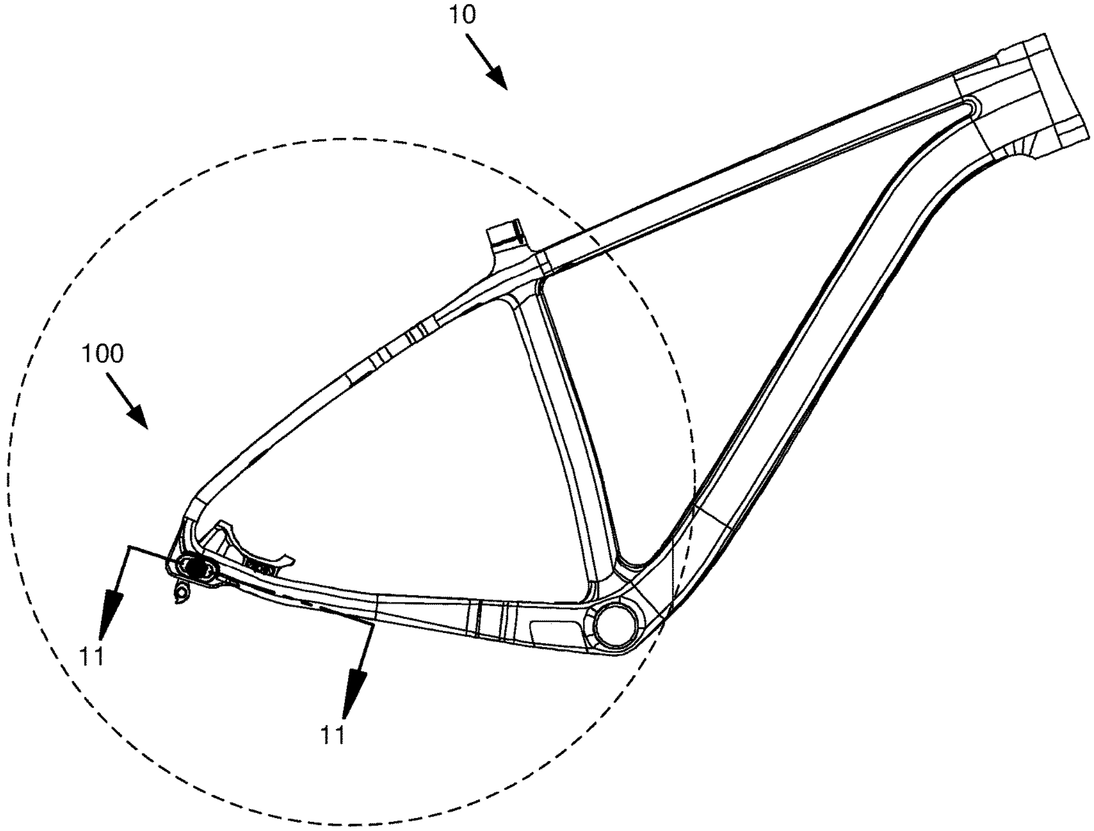
FIG. 10 is a side view of the bicycle frame of FIG. 1 including an example of the axle mounting system.
Figure 11:
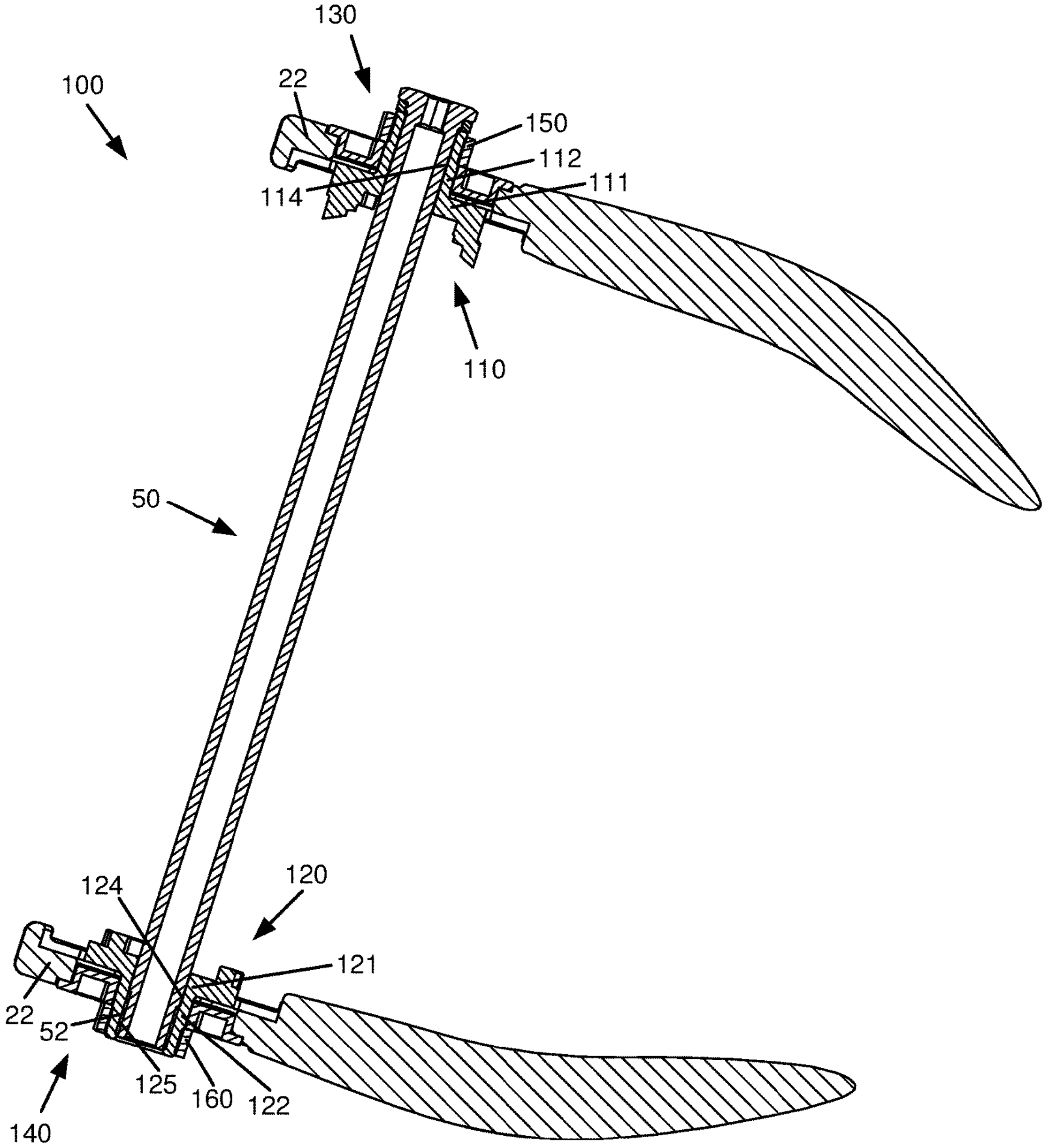
FIG. 11 is a cross-sectional view from the perspective of line 11-11 of FIG. 10.

In one example, and with reference to FIGS. 10 and 11, with axle supports 110 and 120 positioned within drop-outs 22 by respective positioning chips 130 and 140 and secured within drop-outs 22 by respective fixing nuts 150 and 160, threaded end 52 of axle 50 is inserted through hole 114 of sleeve 112 and body 111 of axle support 110, through a hub (not shown) of a rear wheel (not shown) of a bicycle (not shown), and into hole 124 of body 121 and sleeve 122 of axle support 120 such that threaded end 52 of axle 50 is threaded into internal threads 125 of sleeve 122 of axle support 120 to secure axle 50 within drop-outs 22 (and secure a rear wheel to frame 10).

FIGS. 1-11 illustrate one configuration or position of axle mounting system 100. More specifically, in one implementation, positioning chips 130 and 140 establish a "middle" position of axle mounting system 100 so as to position axle 50 in (approximately) a middle of opening 221 of drop-outs 22. In one implementation, to establish additional or different configurations or positions of axle mounting system 100, positioning chips 130 and 140 are interchangeable with other positioning chips.

Figure 12:
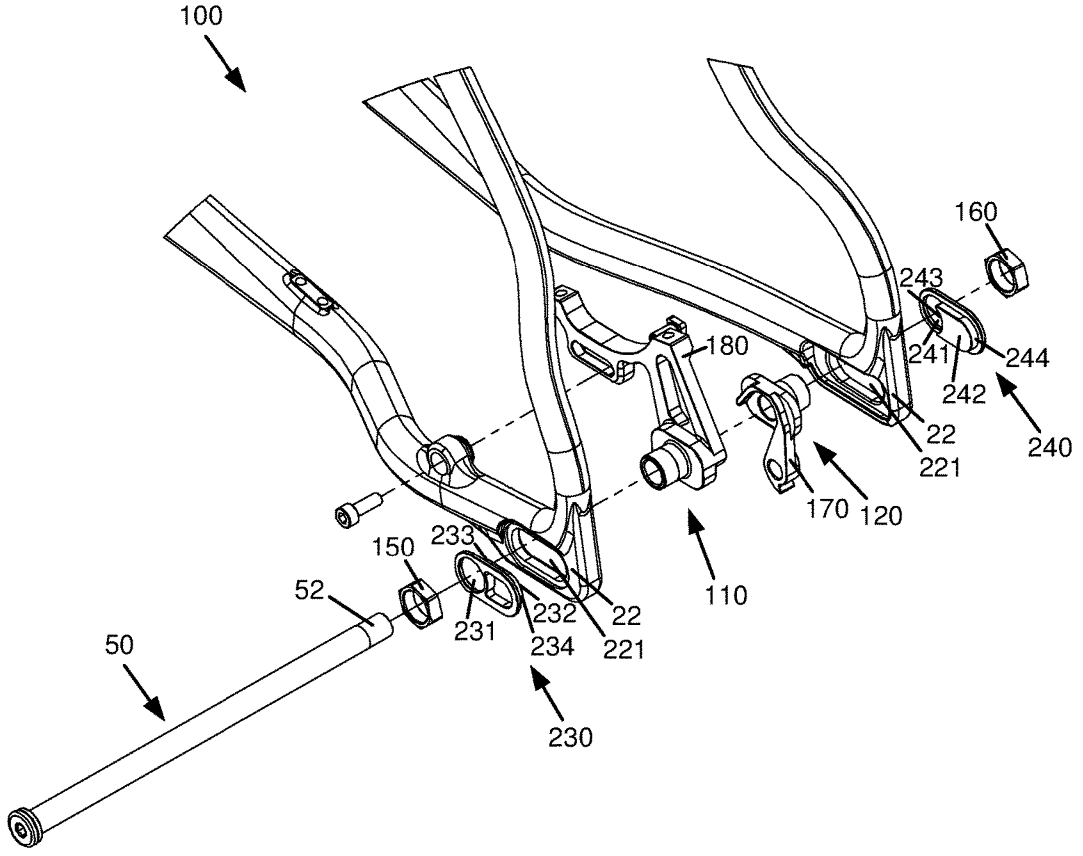
FIGS. 12 and 13 are exploded views illustrating an example of the axle mounting system in another configuration.
Figure 13:
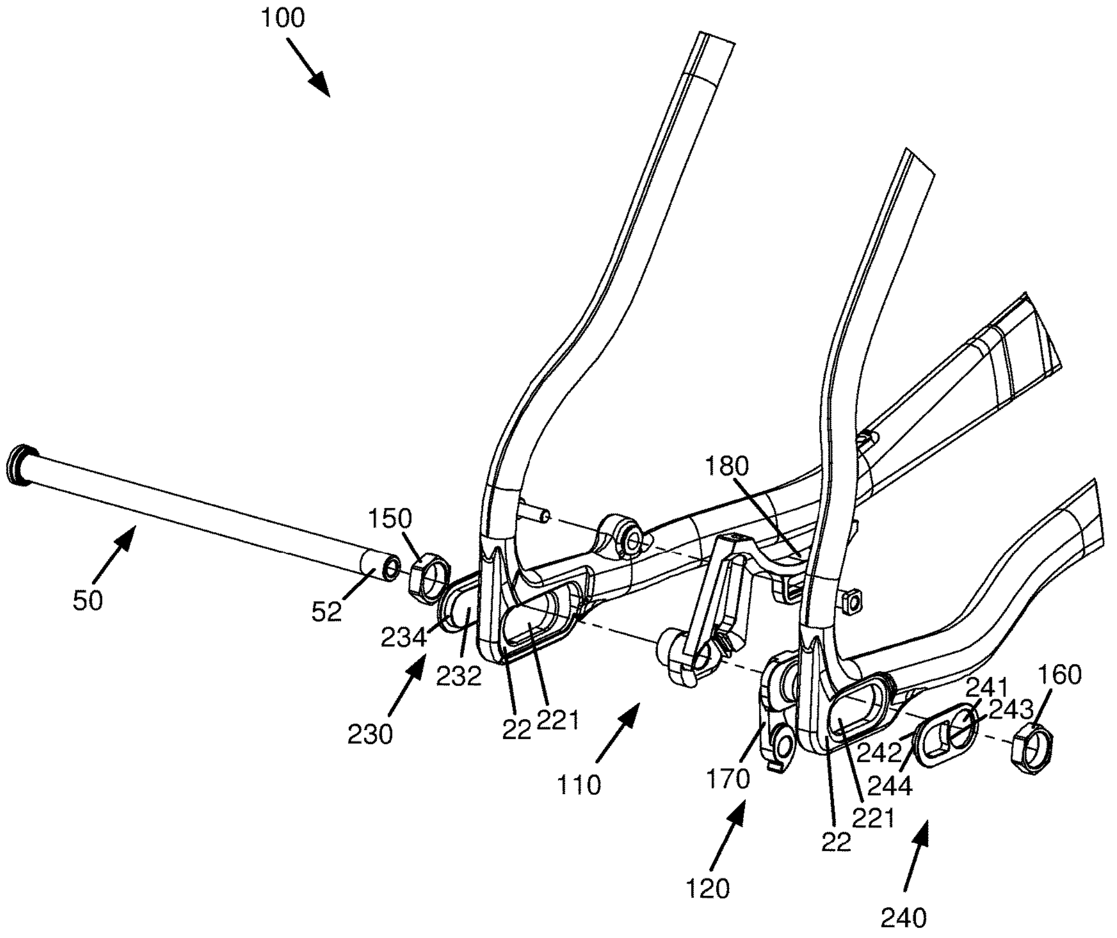

For example, FIGS. 12 and 13 illustrate another configuration or position of axle mounting system 100. In one implementation, to establish another configuration or position of axle mounting system 100 (and another position of axle 50), axle mounting system 100 includes positioning chips 230 and 240. Similar to positioning chips 130 and 140, positioning chips 230 and 240 have respective holes 231 and 241 provided therethrough, and include respective axle support positioning surfaces 233 and 243 and respective chip positioning surfaces 234 and 244 as formed by respective shoulders 232 and 242 provided on one side of respective holes 231 and 241.

In one implementation, positioning chips 230 and 240 are substantially the same (identical), and are asymmetrical about an axis of respective holes 231 and 241. More specifically, holes 231 and 241 are located toward or at an end of a long axis of positioning chips 230 and 240. As such, positioning chips 230 and 240 represent a second pair of positioning chips or positioning spacers for axle mounting system 100.

In one example, positioning chips 230 and 240 are oriented with holes 231 and 241 toward or at a forward end of opening 221 of respective drop-outs 22 such that positioning chips 230 and 240 establish a "forward" position of axle mounting system 100. As such, positioning chips 230 and 240 position axle 50 toward or at a forward end of opening 221 of drop-outs 22.

Figure 14:
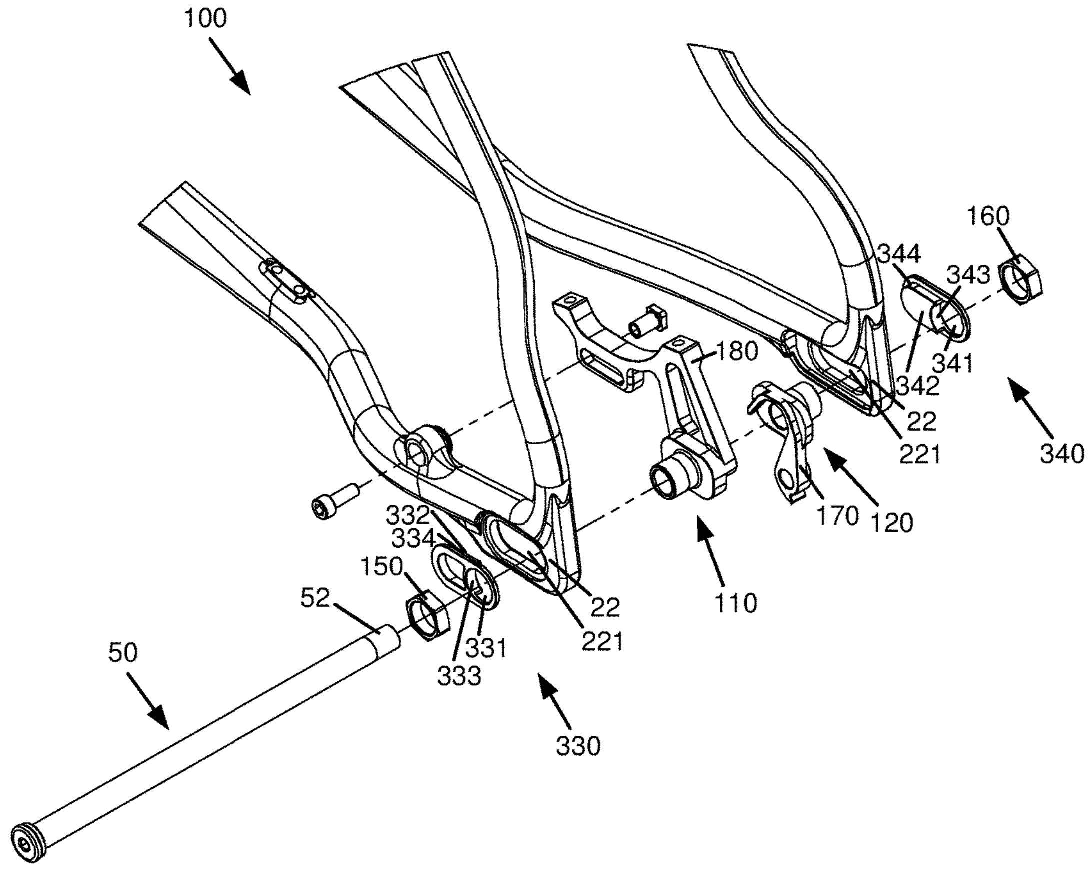
FIGS. 14 and 15 are exploded views illustrating an example of the axle mounting system in another configuration.
Figure 15:
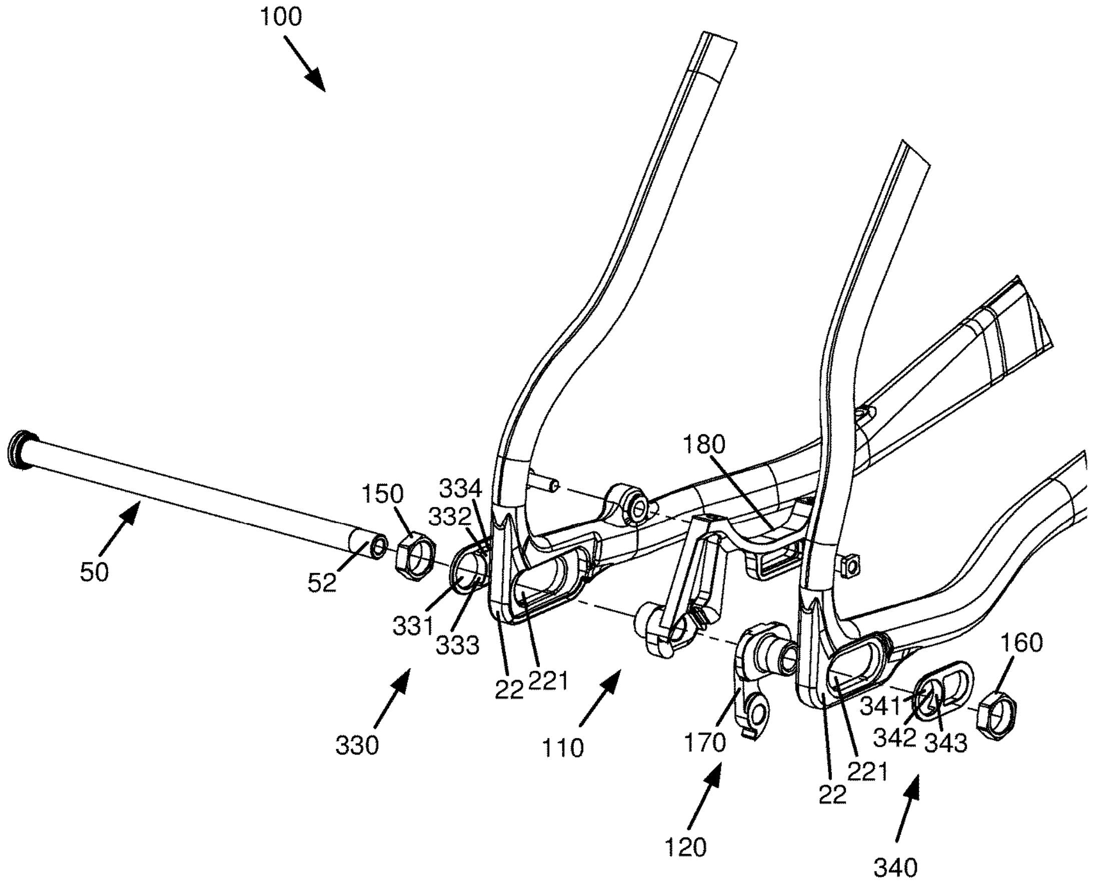

FIGS. 14 and 15 illustrate another configuration or position of axle mounting system 100. In one implementation, to establish another configuration or position of axle mounting system 100 (and another position of axle 50), axle mounting system 100 includes positioning chips 330 and 340. Similar to positioning chips 130 and 140, positioning chips 330 and 340 have respective holes 331 and 341 provided therethrough, and include respective axle support positioning surfaces 333 and 343 and respective chip positioning surfaces 334 and 344 as formed by respective shoulders 332 and 342 provided on one side of respective holes 331 and 341.

In one implementation, positioning chips 330 and 340 are substantially the same (identical), and are asymmetrical about an axis of respective holes 331 and 341. More specifically, holes 331 and 341 are located toward or at an end of a long axis of positioning chips 330 and 340. As such, positioning chips 330 and 340 represent a third pair of positioning chips or positioning spacers for axle mounting system 100.

In one example, positioning chips 330 and 340 are oriented with holes 331 and 341 toward or at a rearward end of opening 221 of respective drop-outs 22 such that positioning chips 330 and 340 establish a "rearward" position of axle mounting system 100. As such, positioning chips 330 and 340 position axle 50 toward or at a rearward end of opening 221 of drop-outs 22.

In one implementation, positioning chips 330 and 340 are or comprise positioning chips 230 and 240 reversed or rotated 180 degrees about an axis extended through holes 231 and 241. Thus, with two sets of positioning chips (e.g., positioning chips 130 and 140, and positioning chips 230 and 240), three positions of axle mounting system 100 and, therefore, three positions of axle 50 (e.g., "middle", "forward", and "rearward") may be established. Although three positions of axle mounting system 100 (with three corresponding positions of axle 50) are illustrated and described, other positions of axle mounting system 100 (with other corresponding positions of axle 50) may be established.

Figure 16:
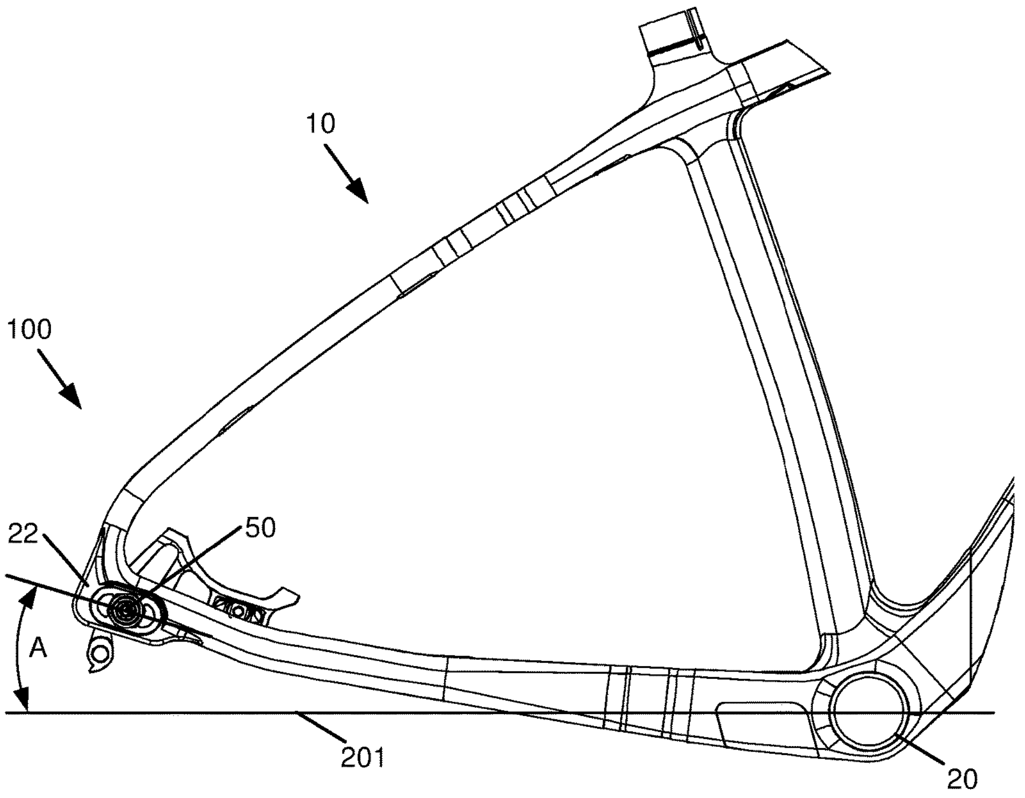
FIG. 16 is an enlarged view of the area within the broken line circle of FIG. 10.

As illustrated in the example of FIG. 16, positioning chips (e.g., positioning chips 130/140, 230/240, and/or 330/340) of axle mounting system 100 are oriented at an angle A relative to a horizontal reference 201 extended from and through a centerline of bottom bracket shell 20 of frame 10. More specifically, a long axis of opening 221 (FIGS. 6, 7, 12, 13, 14, 15) of drop-outs 22 is oriented at angle A such that a long axis of the positioning chips is oriented at angle A. As such, axle supports 110 and 120 (FIGS. 6, 7, 12, 13, 14, 15) of axle mounting system 100 and, therefore, axle 50, move along angle A relative to drop-outs 22 as a position of rear axle 50 is adjusted or varied with the positioning chips. In one implementation, angle A is in a range of approximately 15 degrees to approximately 45 degrees.

As illustrated and described herein, with axle mounting system 100, a position of axle 50 may be adjusted or varied with different positioning chips or spacers. More specifically, by interchanging or reversing positioning chips or spacers, for example, positioning chips 130/140, 230/240, and/or 330/340, a position of axle 50 may be adjusted or varied. As such, with axle mounting system 100, different effective geometries of a frame for a bicycle and, therefore, different handling characteristics of the bicycle may be obtained, and/or different wheel and/or tire sizes or configurations may be accommodated with a single frame for the bicycle.

Figure 16A:
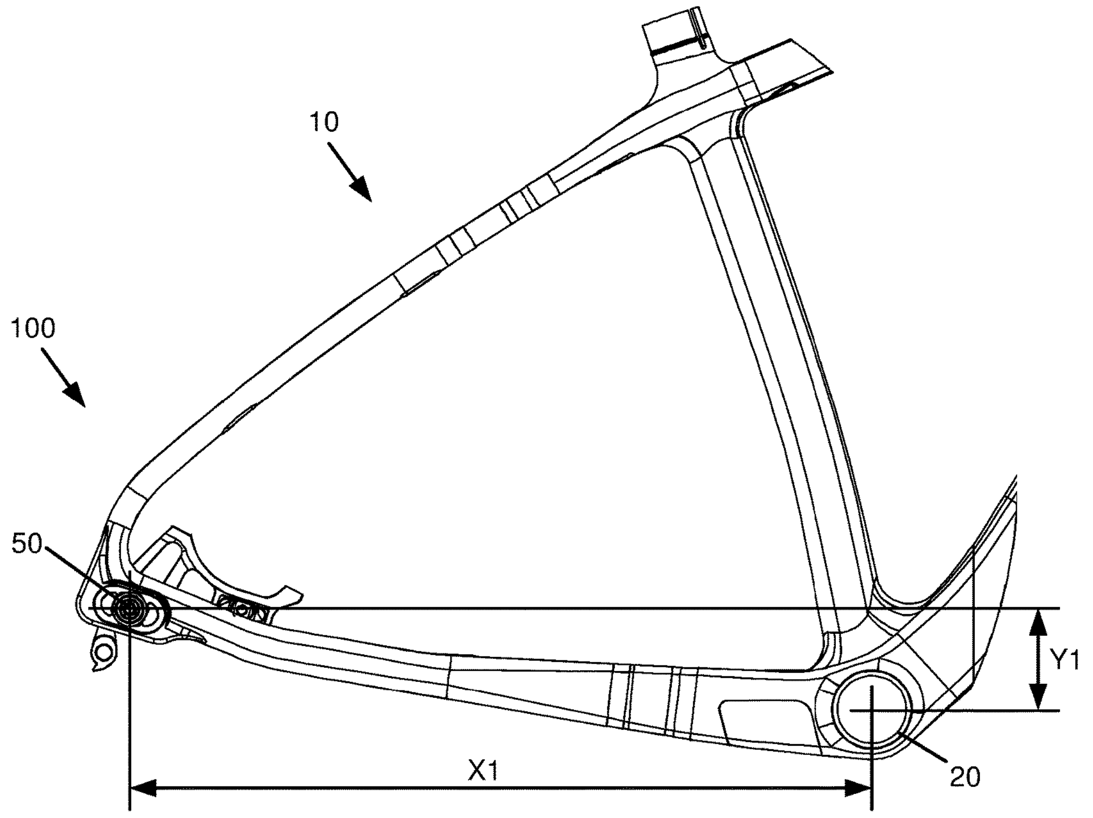
FIGS. 16A, 16B, and 16C are enlarged views of the area within the broken line circle of FIG. 10 illustrating examples of the axle mounting system in different configurations.

For example, as illustrated in the example of FIG. 16A, a "middle" position of axle 50 is established, for example, with positioning chips 130/140 (FIGS. 1-11) of axle mounting system 100. As such, a horizontal distance between a center of bottom bracket shell 20 and axle 50 (i.e., effective chain stay length of frame 10) is defined as X1, and a vertical distance between a center of bottom bracket shell 20 and axle 50 (i.e., bottom bracket drop of frame 10) is defined as Y1.

Figure 16B:
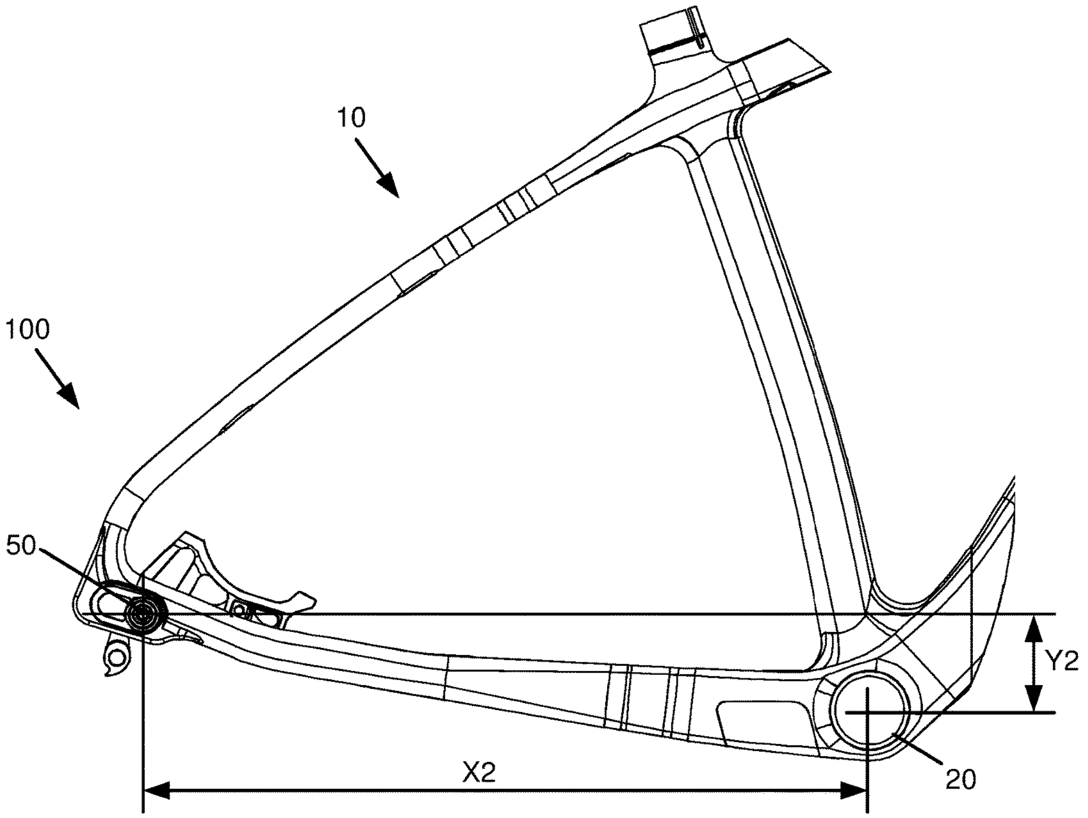

In addition, as illustrated in the example of FIG. 16B, a "forward" position of axle 50 is established, for example, with positioning chips 230/240 (FIGS. 12, 13) of axle mounting system 100. As such, an effective chain stay length of frame 10 is defined as X2 and a bottom bracket drop of frame 10 is defined as Y2, where chain stay length X2 is less than chain stay length X1 and bottom bracket drop Y2 is less than bottom bracket drop Y1.

Figure 16C:
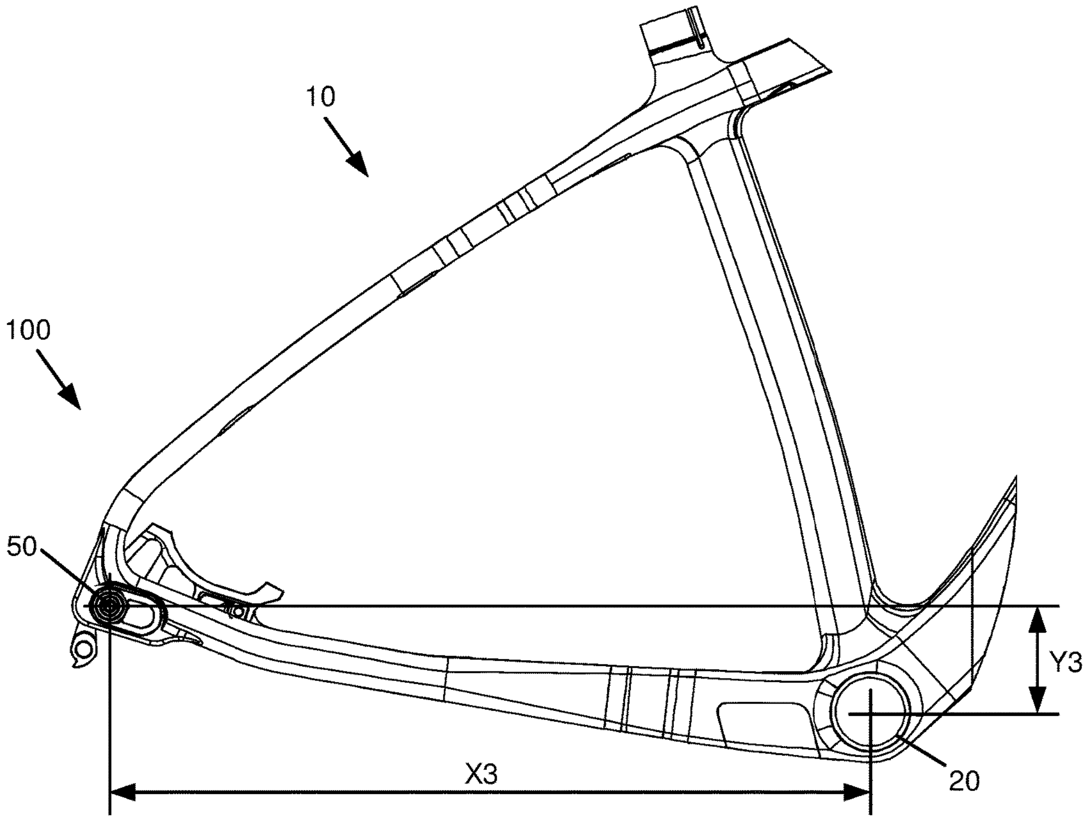

In addition, as illustrated in the example of FIG. 16C, a "rearward" position of axle 50 is established, for example, with positioning chips 330/340 (FIGS. 14, 15) of axle mounting system 100. As such, an effective chain stay length of frame 10 is defined as X3 and a bottom bracket drop of frame 10 is defined as Y3, where chain stay length X3 is greater than chain stay length X1 and bottom bracket drop Y3 is greater than bottom bracket drop Y1.

As such, varying chain stay length (e.g., X1, X2, X3) and bottom bracket drop (e.g., Y1, Y2, Y3) results in different effective geometries of a frame for a bicycle and, therefore, different handling characteristics of the bicycle.

Figure 17A:
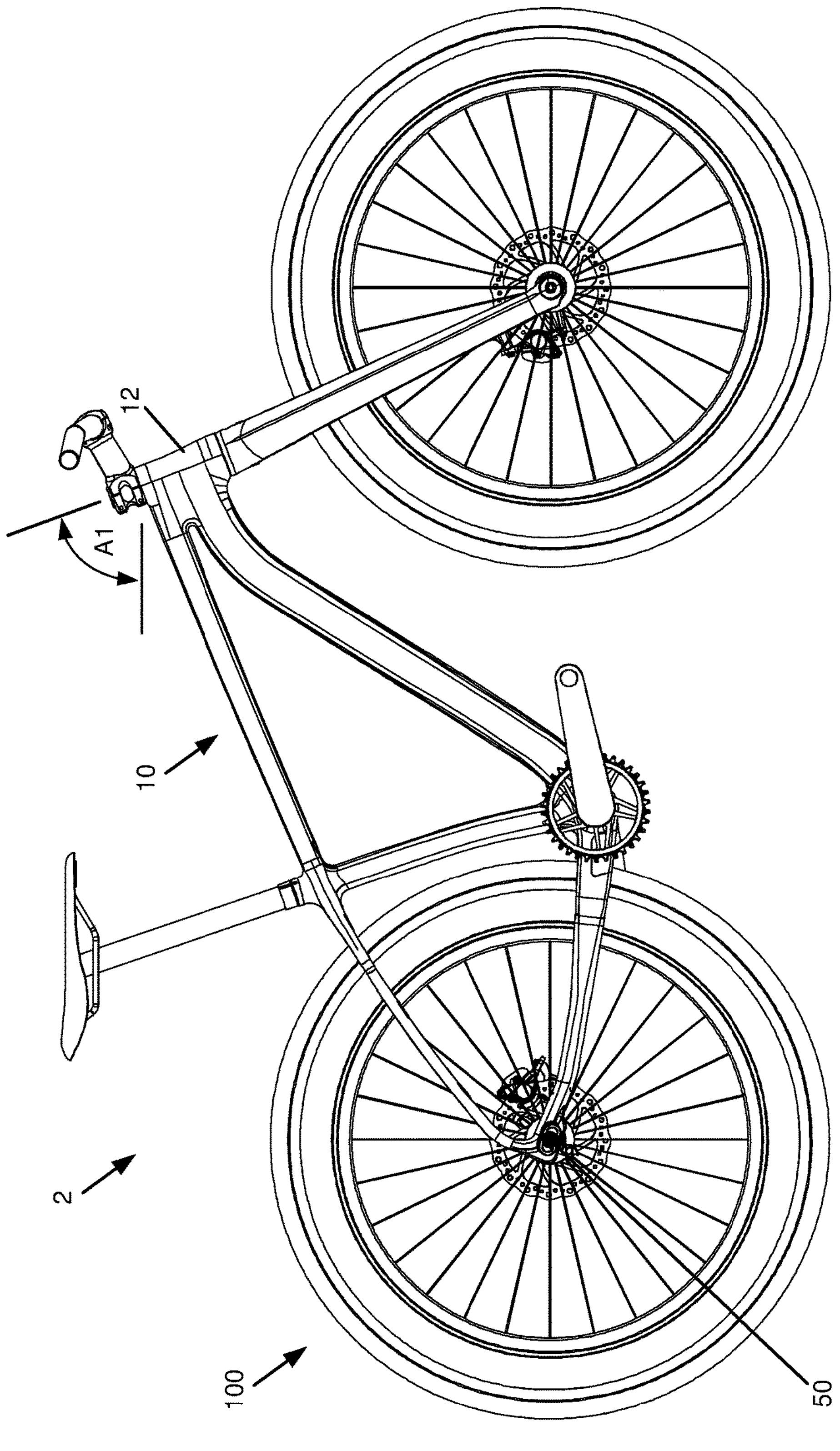
FIGS. 17A, 17B, and 17C illustrate examples of different configurations of a bicycle including different configurations of an axle mounting system in accordance with the present disclosure.

FIG. 17A illustrates an example of a bicycle 2 with axle mounting system 100 and axle 50 in a "middle" position (FIGS. 1-11, 16A), and 26 inch wheels with 26 inch by 4 inch tires (26×4). As such, effective change stay length X1 of frame 10 and bottom bracket drop Y1 of frame 10 are established (FIG. 16A). In addition, an angle of head tube 12 of frame 10 relative to a horizontal reference line (i.e., head tube angle) is defined as A1.

Figure 17B:
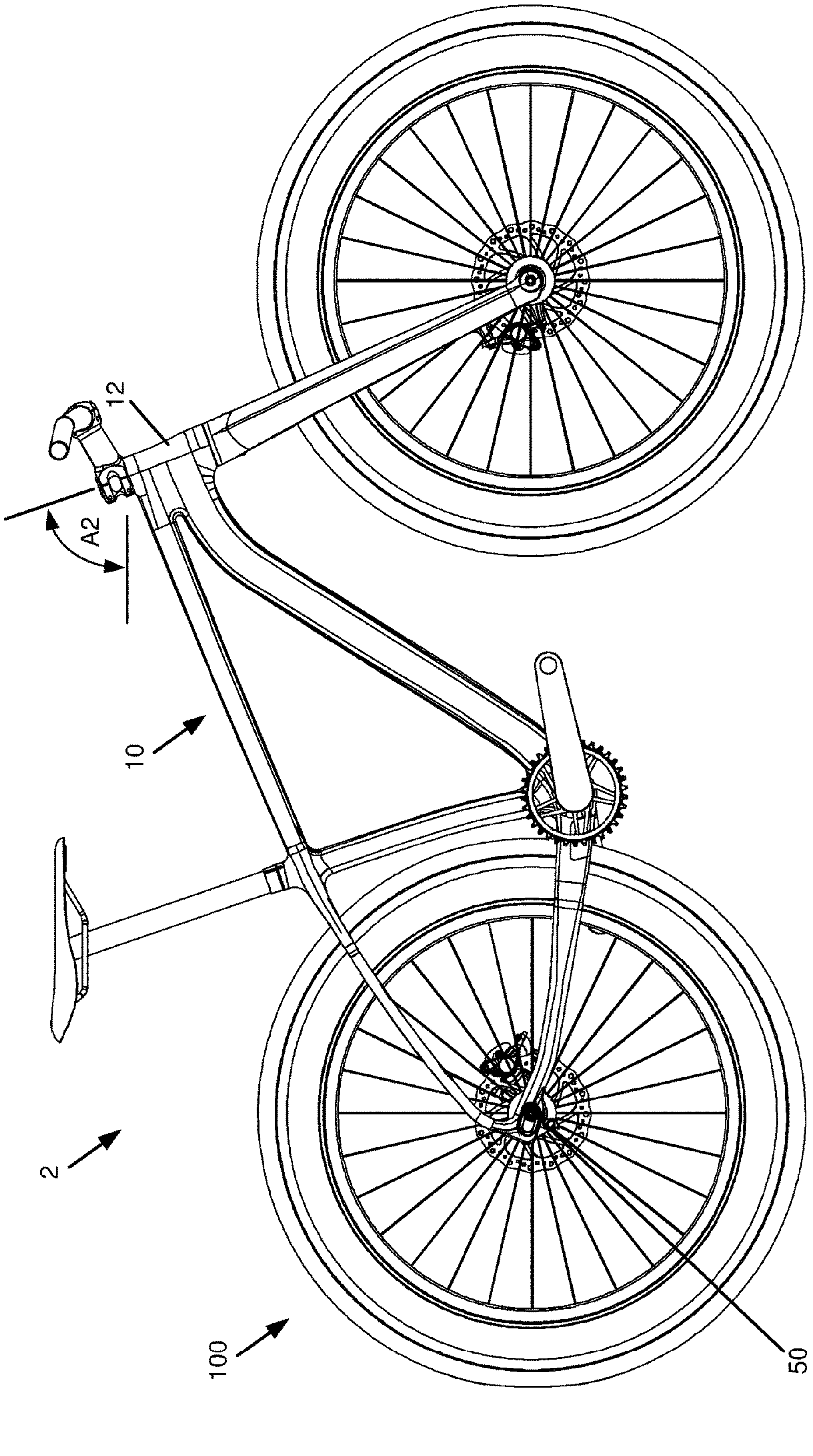

FIG. 17B illustrates an example of bicycle 2 with axle mounting system 100 and axle 50 in a "forward" position (FIGS. 12, 13, 16B), and 26 inch wheels with 26 inch by 4 inch tires (26×4). As such, effective chain stay length X2 of frame 10 and bottom bracket drop Y2 of frame 10 are established (FIG. 16B). In addition, a head tube angle A2 of frame 10 is established, where head tube angle A2 is greater than head tube angle A1.

Figure 17C:
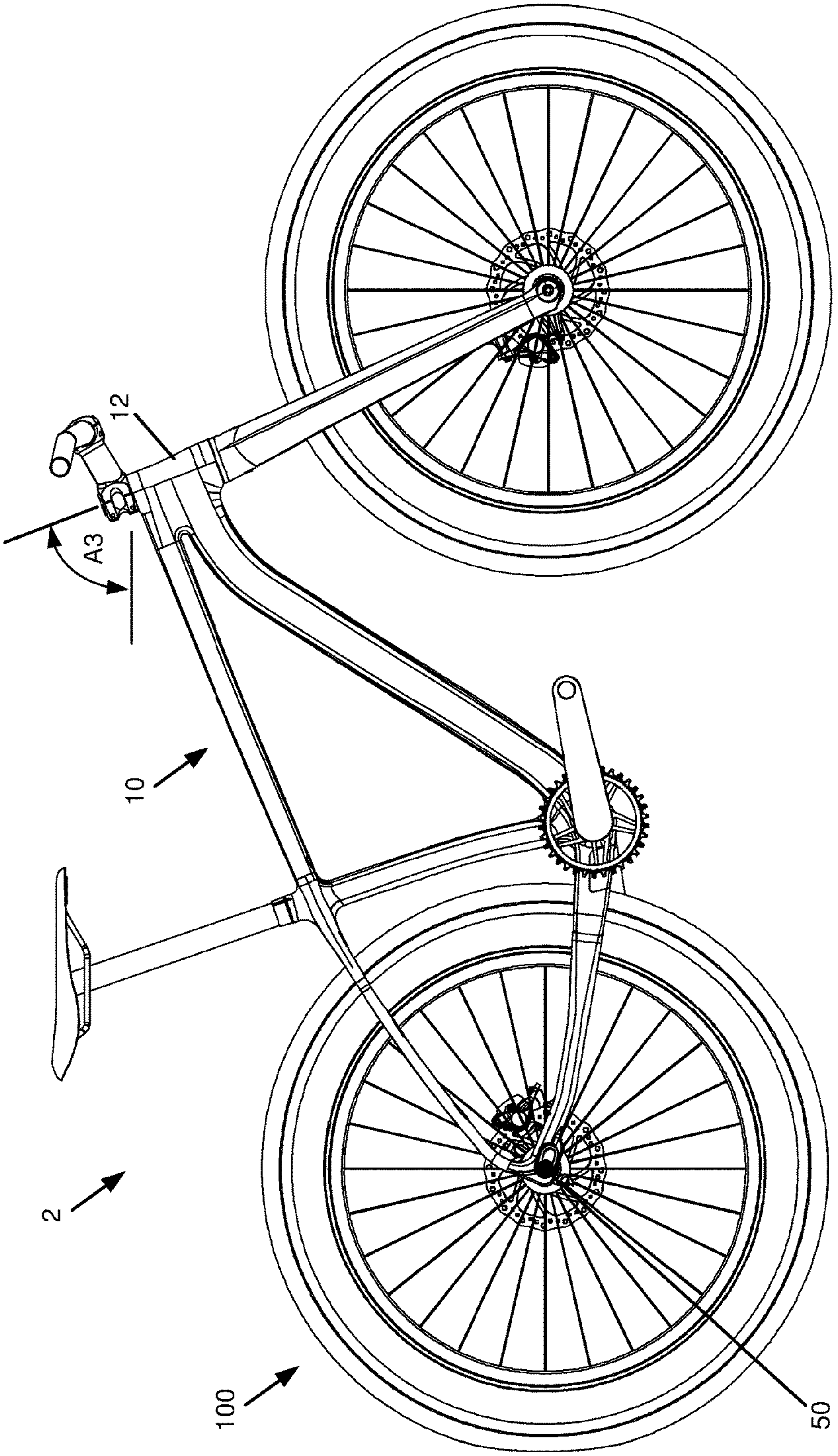

FIG. 17C illustrates an example of bicycle 2 with axle mounting system 100 and axle 50 in a "rearward" position (FIGS. 14, 15, 16C), and 26 inch wheels with 26 inch by 4 inch tires (26×4). As such, effective chain stay length X3 of frame 10 and bottom bracket drop Y3 of frame 10 are established (FIG. 16C). In addition, a head tube angle A3 of frame 10 is established, where head tube angle A3 is less than head tube angle A1.

As such, with axle mounting system 100, different effective geometries of frame 10 for bicycle 2 and, therefore, different handling characteristics of bicycle 2 may be obtained with a single frame for bicycle 2.

Figure 18:
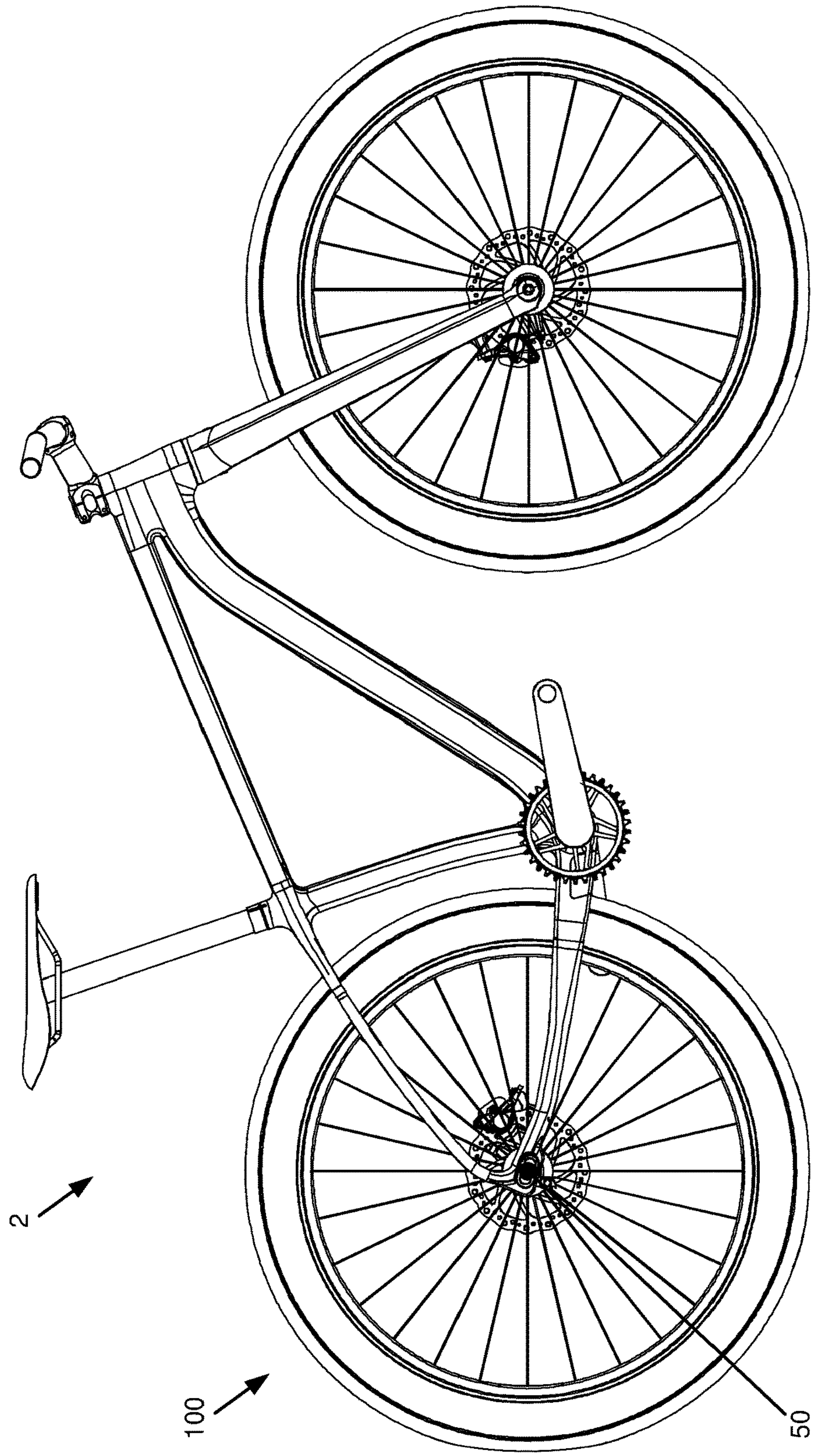
FIG. 18 illustrates another example of a configuration of a bicycle including an axle mounting system in accordance with the present disclosure.
Figure 19:
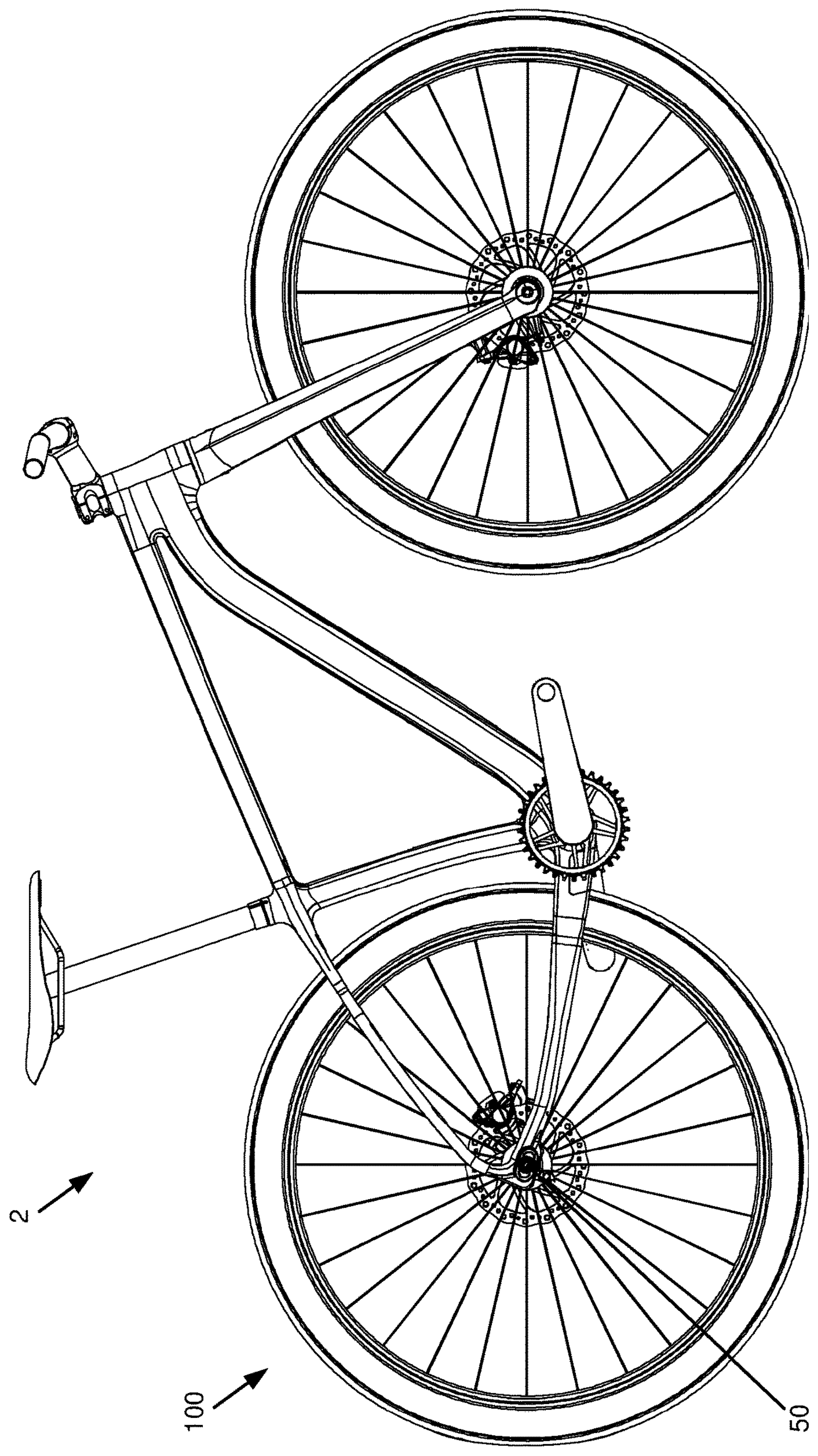
FIG. 19 illustrates another example of a configuration of a bicycle including an axle mounting system in accordance with the present disclosure.

In addition, FIG. 18 illustrates an example of bicycle 2 with axle mounting system 100 and axle 50 in a "middle" position, and 27.5 inch wheels with 27.5 inch by 3 inch tires (27.5×3), and FIG. 19 illustrates an example of bicycle 2 with axle mounting system 100 and axle 50 in a "middle" position, and 29 inch wheels with 29 inch by 2 inch tires (29×2).

As such, with axle mounting system 100, different wheel and/or tire sizes or configurations may be accommodated with a single frame for bicycle 2.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. An axle mounting system, comprising:

a pair of axle supports each to be positioned within a respective one of a pair of openings of drop-outs and each having an axle support hole therethrough;

a pair of positioning chips each to be positioned within a respective one of the openings and each having a hole therethrough to receive a respective one of the axle supports; and a pair of fixing nuts each to secure the respective one of the axle supports within the respective one of the openings, the pair of positioning chips comprising a first pair of positioning chips each having a first hole therethrough to receive a respective one of the axle supports, and further comprising:

a second pair of positioning chips each having a second hole therethrough to receive a respective one of the axle supports, each of the first pair of positioning chips being substantially symmetrical about an axis of the first hole, and each of the second pair of positioning chips being asymmetrical about an axis of the second hole, the first pair of positioning chips and the second pair of positioning chips being interchangeable to adjust a position of the axle supports within the openings, and the second pair of positioning chips being reversible to adjust a position of the axle supports within the openings.

2. The axle mounting system of claim 1, the axle supports slidingly positionable within the openings to adjust a position of the axle supports within the openings, and the positioning chips to establish the position of the axle supports within the openings.

3. The axle mounting system of claim 1, each of the axle supports including a body and a sleeve extended from the body, the body of a respective one of the axle supports to be positioned within the respective one of the openings, and the sleeve of a respective one of the axle supports to be inserted into the hole of a respective one of the positioning chips.

4. The axle mounting system of claim 3, the sleeve of a respective one of the axle supports to receive a respective one of the fixing nuts to secure the respective one of the axle supports within the respective one of the openings.

5. The axle mounting system of claim 3, each of the positioning chips including at least one axle support positioning surface to contact the sleeve of a respective one of the axle supports.

6. The axle mounting system of claim 1, each of the positioning chips including at least one chip positioning surface to contact a perimeter surface of the respective one of the openings.

7. The axle mounting system of claim 1, the axle support hole of each of the axle supports to receive a portion of an axle therein.

8. The axle mounting system of claim 1, the drop-outs comprising drop-outs of a bicycle frame.

9. The axle mounting system of claim 8, one of the axle supports including a derailleur hanger, the derailleur hanger to be positioned with the one of the axle supports.

10. The axle mounting system of claim 8, one of the axle supports including a disc brake caliper mount, the disc brake caliper mount to be positioned with the one of the axle supports.

11. An axle mounting system, comprising:

a positioning chip to be positioned within an opening of a drop-out, the positioning chip having a hole therethrough;

an axle support including a sleeve having external threads, the sleeve to be inserted into and extended through the hole of the positioning chip; and a fixing nut to be threaded onto the external threads of the sleeve of the axle support to secure the axle support within the opening.

12. The axle mounting system of claim 11, the axle support including a body and the sleeve extended from the body, the body to be variably positioned within the opening.

13. The axle mounting system of claim 11, the positioning chip including shoulders on opposite sides of the hole, the shoulders of the positioning chip to extend into the opening and the sleeve of the axle support to contact the shoulders of the positioning chip.

14. The axle mounting system of claim 13, the shoulders of the positioning chip to contact a perimeter of the opening.

15. The axle mounting system of claim 11, the positioning chip being substantially symmetrical about an axis of the hole, the positioning chip to be interchanged with another positioning chip to vary a position of the axle support within the opening.

16. The axle mounting system of claim 11, the drop-out comprising a drop-out of a bicycle frame, the opening of the drop-out having a closed perimeter.

17. The axle mounting system of claim 16, the positioning chip to be positioned on one side of the drop-out, and the axle support to be positioned on an opposite side of the drop-out.

18. The axle mounting system of claim 17, the sleeve of the axle support to extend through the opening of the drop-out, and the fixing nut to be positioned on the one side of the drop-out.

19. The axle mounting system of claim 11, the positioning chip being asymmetrical about an axis of the hole, the positioning chip to be reversed to vary a position of the axle support within the opening.

20. An axle mounting system, comprising:

a positioning chip to be positioned within an opening of a drop-out, the positioning chip having a hole therethrough;

an axle support including a sleeve, the sleeve to be inserted into and extended through the hole of the positioning chip; and a fixing nut to be threaded onto the sleeve of the axle support to secure the axle support within the opening, the positioning chip being asymmetrical about an axis of the hole, the positioning chip to be reversed to vary a position of the axle support within the opening.

21. The axle mounting system of claim 20, the axle support including a body and the sleeve extended from the body, the body to be variably positioned within the opening.

22. The axle mounting system of claim 20, the positioning chip including shoulders on opposite sides of the hole, the shoulders of the positioning chip to extend into the opening and the sleeve of the axle support to contact the shoulders of the positioning chip.

23. The axle mounting system of claim 22, the shoulders of the positioning chip to contact a perimeter of the opening.

24. The axle mounting system of claim 20, the positioning chip comprising a first positioning chip having a first hole therethrough, and further comprising:

a second positioning chip having a second hole therethrough, the second positioning chip being substantially symmetrical about an axis of the second hole, the second positioning chip to be interchanged with the first positioning chip to vary a position of the axle support within the opening.

25. The axle mounting system of claim 20, the drop-out comprising a drop-out of a bicycle frame, the opening of the drop-out having a closed perimeter.

26. The axle mounting system of claim 25, the positioning chip to be positioned on one side of the drop-out, and the axle support to be positioned on an opposite side of the drop-out.

27. The axle mounting system of claim 26, the sleeve of the axle support to extend through the opening of the drop-out, and the fixing nut to be positioned on the one side of the drop-out.

28. An axle mounting system, comprising:

a positioning chip to be positioned within an opening, the positioning chip having a hole therethrough;

an axle support including a sleeve, the sleeve to be inserted into and extended through the hole of the positioning chip; and a fixing nut to be threaded onto the sleeve of the axle support to secure the axle support within the opening, the opening comprising an opening of a drop-out of a bicycle frame, the positioning chip to be positioned on one side of the drop-out, and the axle support to be positioned on an opposite side of the drop-out.

29. The axle mounting system of claim 28, the sleeve of the axle support to extend through the opening of the drop-out, and the fixing nut to be positioned on the one side of the drop-out.

30. The axle mounting system of claim 28, the axle support including a body and the sleeve extended from the body, the body to be variably positioned within the opening.

31. The axle mounting system of claim 28, the positioning chip including shoulders on opposite sides of the hole, the shoulders of the positioning chip to extend into the opening and the sleeve of the axle support to contact the shoulders of the positioning chip.

32. The axle mounting system of claim 31, the shoulders of the positioning chip to contact a perimeter of the opening.

33. The axle mounting system of claim 28, the positioning chip being substantially symmetrical about an axis of the hole, the positioning chip to be interchanged with another positioning chip to vary a position of the axle support within the opening.

34. The axle mounting system of claim 28, the positioning chip being asymmetrical about an axis of the hole, the positioning chip to be reversed to vary a position of the axle support within the opening.

35. The axle mounting system of claim 28, the opening of the drop-out having a closed perimeter.

* * * * *